United States Patent
Jassal et al.

(10) Patent No.: US 11,856,468 B2
(45) Date of Patent: Dec. 26, 2023

(54) METHODS AND DEVICES FOR ENHANCED USER-CENTRIC INTER-CELL MOBILITY MANAGEMENT

(71) Applicants: Aman Jassal, Stittsville (CA); Xi Zhang, Kanata (CA)

(72) Inventors: Aman Jassal, Stittsville (CA); Xi Zhang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 17/230,204

(22) Filed: Apr. 14, 2021

(65) Prior Publication Data

US 2021/0329512 A1 Oct. 21, 2021

Related U.S. Application Data

(60) Provisional application No. 63/010,398, filed on Apr. 15, 2020.

(51) Int. Cl.
*H04W 36/00* (2009.01)
*H04W 36/08* (2009.01)

(52) U.S. Cl.
CPC ... *H04W 36/0085* (2018.08); *H04W 36/0058* (2018.08); *H04W 36/08* (2013.01)

(58) Field of Classification Search
CPC ......... H04W 36/0085; H04W 36/0058; H04W 36/08
See application file for complete search history.

(56) References Cited

U.S. PATENT DOCUMENTS

| 2012/0302240 A1 | 11/2012 | Tamaki et al. |
| 2017/0366996 A1* | 12/2017 | Park ..................... H04W 48/14 |

FOREIGN PATENT DOCUMENTS

| CN | 102958079 A | 3/2013 |
| CN | 108605273 A | 9/2018 |
| CN | 108605274 A | 9/2018 |
| CN | 108605275 A | 9/2018 |

OTHER PUBLICATIONS

"3rd Generation Partnership Project; Technical Specification Group Radio Access Network; NR; Physical layer procedures for control" (Release 15), Technical Specification, 3GPP TS 38.213 V15.9.0, Mar. 2020, 110 pages.

(Continued)

*Primary Examiner* — Elton Williams

(57) ABSTRACT

Aspects of the present disclosure pertain to mobility management processes for cells directly at Layer 1 (L1) or Layer 2 (L2), in a manner that reduces latency of inter-cell mobility methods and enhances user experience under mobility (i.e. handover). To address some of the limitations of existing inter-cell mobility methods, embodiments of the disclosure aid in enabling system information acquisition from neighbor cells for inter-cell mobility, system information update for neighbor cells for inter-cell mobility, radio link monitoring (RLM) for inter-cell mobility and using an uplink transmission mechanism for inter-cell mobility to acknowledge receipt of a handover message for inter-cell mobility.

24 Claims, 13 Drawing Sheets

(56) References Cited

OTHER PUBLICATIONS

"3rd Generation Partnership Project; Technical Specification Group Radio Access Network; NR; Medium Access Control (MAC) protocol specification" (Release 15), Technical Specification, 3GPP TS 38.321 V15.8.0, Dec. 2019, 78 pages.
"3rd Generation Partnership Project; Technical Specification Group Radio Access Network; NR; Radio Resource Control (RRC) protocol specification" (Release 15), Technical Specification, 3GPP TS 38.331 V15.8.0, Dec. 2019, 532 pages.
Ericsson; "Lower-layer mobility enhancements"; 3GPP TSG-RAN WG1 Meeting #99, Reno, USA, Nov. 18-22, 2019, R1-1912060, 10 pages.
3GPP TS 38.331 V15.9.0 (Mar. 2020), 3rd Generation Partnership Project; Technical Specification Group Radio Access Network; NR; Radio Resource Control (RRC) protocol specification (Release 15), 536 pages.

* cited by examiner

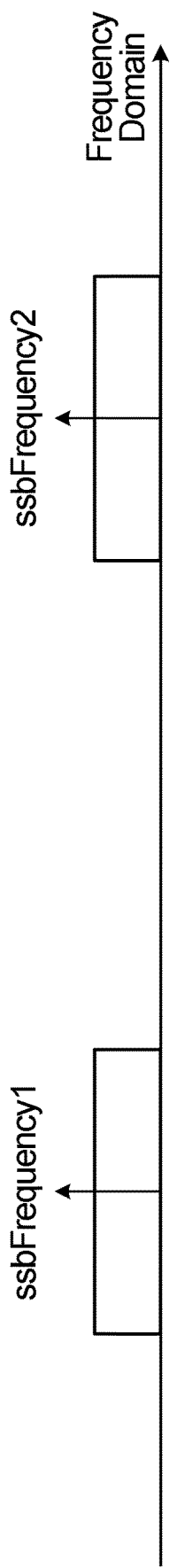
FIG. 1A
FIG. 1B
FIG. 1C

| 1086 | 1085 | 1084 | 1083 | 1082 | 1081 |
|---|---|---|---|---|---|
| ControlResource SetZero = 11 | System Frame Number = 3 | RRM CSI-RS Index = 2 | Physical Cell Identity = 12 | RRM CSI-RS SCS = 1 | RRM CSI-RS ARFCN = 49 |
| N3311 counter = 6 | T310 timer = 100 | New UE RNTI = 249 | UL RA response window = 8 | UL RA preamble index = 5 | SearchSpaceSet Zero = 4 |
| 1096 | 1095 | 1094 | 1093 | 1092 | 1091 |

METHODS AND DEVICES FOR ENHANCED USER-CENTRIC INTER-CELL MOBILITY MANAGEMENT

RELATED APPLICATIONS

This application claims priority to U.S. Provisional Application No. 63/010,398 filed on Apr. 15, 2020, which is incorporated herein by reference in its entirety.

TECHNICAL FIELD

The present disclosure relates generally to wireless communications, and in particular embodiments, to methods and devices for user-centric inter-cell mobility management.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication.

Resources are required to perform uplink and downlink communications in such wireless communication systems. For example, a base station may wirelessly transmit data, such as a transport block (TB), using wireless signals and/or physical layer channels, to a UE in a downlink transmission at a particular frequency and over a particular duration of time. The frequency and time duration used are examples of resources.

Each base station transmits and/or receives wireless signals within a particular geographic region or area, sometimes referred to as a "cell". When a UE travels it may move from one cell to another cell which results in a base station currently serving the UE in the cell the UE is leaving having to handover an ongoing call, data session, or any other service provided by a network service provider, to a new base station in a cell that the UE is entering. The functionality of a wireless network of a wireless communication system providing continuous coverage as UEs move from one cell to another cell (i.e. "inter-cell") is often referred to as inter-cell mobility management.

Current methods for inter-cell mobility management in wireless communication systems (e.g. cellular systems) involve Layer 3 (L3)-based methods for inter-cell mobility management such as handover commands and L3-filtered radio resource management (RRM) measurements and reporting. Such L3-based methods for inter-cell mobility management incur delays and interruptions in the UE's connectivity as a UE moves from one cell to a different cell. A UE is configured with RRM reference signals (RRM-RSs), examples of which are synchronization signal/physical broadcast channel (SS/PBCH) blocks and channel state information reference signal (CSI-RS), to perform RRM measurements on reference signals and report cell-averaged measurement reports back to the network. Based on the RRM reports sent by the UE, the network of a wireless communication system issues handover commands to the UE to initiate handover. As part of handover, the UE synchronizes with a target cell at the physical layer, acquires system information and cell information and resets certain functions such as Radio Link Monitoring.

SUMMARY

Aspects of the present disclosure pertain to methods for inter-cell mobility management directly at Layer 1 (L1) or Layer 2 (L2), which use radio resource control (RRC) signaling (i.e. RRC messages), in a manner that reduces latency of methods for inter-cell mobility management and enhances user experience under mobility (i.e. during handover). Methods for inter-cell mobility management typically involve a UE explicitly synchronizing at the physical layer with a neighbor cell, also referred to as a target cell (i.e. the cell the UE is being handed over to), and acquiring system information and cell information before the target cell can start sending physical downlink control channel (PDCCH) transmissions that schedule physical downlink shared channel (PDSCH) transmissions carrying UE-specific data.

To address some of the limitations of existing methods for inter-cell mobility management, embodiments of the disclosure aid in enabling system information acquisition (i.e. acquisition of system information) from the network via neighbor cells for inter-cell mobility, system information update (i.e. updating system information) for neighbor cells for inter-cell mobility, radio link monitoring (RLM) for inter-cell mobility and using a mechanism for uplink transmission ("uplink transmission mechanism") for inter-cell mobility to acknowledge receipt of a handover message for inter-cell mobility.

Embodiments pertaining to system information acquisition (i.e. acquiring system information) from neighbor cells may simplify the methods for inter-cell mobility management by introducing additional steps during RRM measurement (i.e. when a UE performs RRM measurement). A first additional step involves the network (i.e., the radio access network) transmitting an indication to the UE about the frequency layer, reference signals and physical cell identifiers (PCIs) that the UE is instructed to measure for RRM measurements. A second additional step involves the UE detecting the indicated reference signals associated to the indicated PCIs on the indicated frequency layer and acquiring system information (i.e. master information block (MIB)) and cell-specific information (i.e. system information block (SIB1)). These two additional steps constitute a simplified cell search process. A cell search process typically involves acquiring time and frequency synchronization as well as detecting the PCI of a cell. The two additional steps mentioned above allow the UE to simplify the PCI detection part of a cell search process as the PCI information is directly supplied to the UE by the network, leaving the UE to only acquire time and frequency synchronization.

Embodiments pertaining to system information update (i.e. updating system information) for neighbor cells for inter-cell mobility may enable efficient methods for inter-cell mobility management. In some embodiments, the UE performs a simplified cell search process by acquiring time and frequency synchronization, skipping the detection of the PCI because the relevant PCIs are provided via a media access control-control element (MAC-CE) command. This allows the UE to experience smoother inter-cell mobility (i.e. handover) by simplifying the cell search process to acquiring time and frequency synchronization. System information updating (i.e. updating of system information) for neighbor cells for inter-cell mobility according to aspects of the disclosure also may lower latency of methods for inter-cell mobility management because the UE is not required to wait for the SS/PBCH block carrying system information (SI) as the system information is provided directly in the MAC-CE command. Embodiments pertaining to system information updating (i.e., updating system information) for neighbor cells for inter-cell mobility may enable the UE to move between different cells (i.e. from one cell to another different cell) without having to perform a cell search process, i.e. without acquiring time and frequency synchronization or detecting the physical cell identity of a neighbor cell. The network directly supplies all of the necessary system/cell-specific parameters to the UE.

Embodiments pertaining to RLM for inter-cell mobility may enable efficient methods for inter-cell mobility management, which involves the UE acquiring physical layer synchronization and essential system information (e.g. MIB/SIB1) as part of RRM measurement, allowing the UE to experience smoother inter-cell mobility (i.e. handover) by simplifying the cell search process to just acquiring time and frequency synchronization. Embodiments pertaining to RLM for inter-cell mobility may enable faster UE processing of RLM events received from the network via the neighbor cell, thereby enabling L2-based RLM. Embodiments pertaining to RLM for inter-cell mobility may simplify the methods for inter-cell mobility management by introducing additional steps during RRM measurement (i.e. when a UE performs RRM measurement). A first step involves the network transmitting an indication to the UE about the frequency layer, reference signals and PCIs that the UE is instructed to measure for RRM purposes. A second step involves the UE detecting the indicated reference signals associated to the indicated PCIs on the indicated frequency layer and acquiring system information (i.e. MIB) and cell-specific information (i.e. SIB1). Embodiments pertaining to RLM for inter-cell mobility may enable the UE to move between different cells (i.e. from one cell to a neighbor) and perform RLM without any interruption at the physical layer.

Embodiments pertaining to using an uplink transmission mechanism for inter-cell mobility (i.e. acknowledging receipt of a handover message for inter-cell mobility) may enable efficient inter-cell mobility management methods, which involves the UE acquiring physical layer synchronization and essential system information (e.g. MIB/SIB1) as part of RRM measurement, allowing the UE to experience smoother inter-cell mobility (i.e. handover) by simplifying the cell search process to just acquiring time and frequency synchronization. Embodiments pertaining to using an uplink transmission mechanism for inter-cell mobility to acknowledge receipt of a handover message for inter-cell mobility may include transmitting to the network via the neighbor cell, an acknowledgement of receipt of r of a handover message for inter-cell mobility. Embodiments pertaining to using an uplink transmission mechanism for inter-cell mobility to acknowledge receipt of a handover message for inter-cell mobility may enable faster UE processing of UL synchronization to the network via a neighbor cell, thereby enabling L1-based UL synchronization. Embodiments pertaining to using an uplink transmission mechanism for inter-cell mobility to acknowledge receipt of a handover message for inter-cell mobility) may simplify the inter-cell mobility management method by using fast UL timing adjustment in part by the network indicating an UL PUSCH field, indicating to the UE the UL resources to use to transmit the PUSCH, the transmit power to use, and the timing advance (TA) to use. Embodiments pertaining to an uplink transmission mechanism to acknowledge receipt of a handover message for inter-cell mobility may constitute a simplified and fast uplink timing adjustment.

Embodiments pertaining to using an uplink transmission mechanism for inter-cell mobility to acknowledge receipt of a handover message for inter-cell mobility may enable efficient inter-cell mobility management methods, which involves the UE acquiring physical layer synchronization and essential system information (e.g. MIB/SIB1) as part of RRM measurement process, allowing the UE to experience smoother inter-cell mobility (i.e. handover) by simplifying the cell search process to just acquiring time and frequency synchronization. Embodiments pertaining to an uplink transmission mechanism to acknowledge receipt of a handover message for inter-cell mobility may enable faster UE processing, thereby enabling L1-based UL synchronization. Embodiments pertaining to using the uplink transmission mechanism for inter-cell mobility to acknowledge receipt of a handover message for inter-cell mobility may simplify the methods for inter-cell mobility management by using fast UL timing adjustment in part by the network indicating an UL random access (RA) field, indicating to the UE the UL resources to use to transmit the RA preamble, the transmit power to use, and the TA to use. Embodiments pertaining to an uplink transmission mechanism for inter-cell mobility (i.e., acknowledging receipt of a handover message for inter-cell mobility) may constitute a simplified and fast uplink timing adjustment.

According to some aspects of the disclosure there is a method for performing inter-cell mobility management that includes receiving, by a user equipment (UE) from a network via a source cell, higher-layer signaling (i.e. a higher-layer message) including configuration information for measuring radio resource management reference signals (RRM-RS), receiving, by the UE from the network via the source cell, at least one of a Layer 1 (L1) and a Layer 2 (L2) signaling (i.e. L1 and L2 message) comprising additional configuration information for enabling the UE to measure RRM-RS from at least one identified neighbor cell, and using the additional configuration information from the at least one of the L1 and the L2 signaling (i.e. L1 and L2 message) to perform at least one of various processes of an inter-cell mobility management method. Examples of such processes of an inter-cell mobility management method include acquiring system information from at least one identified neighbor cell for inter-cell mobility; updating system information for the at least one identified neighbor cell for inter-cell mobility; radio link monitoring (RLM) for the at least one identified neighbor cell for inter-cell mobility; and uplink transmission mechanism for the at least one identified neighbor cell for inter-cell mobility (i.e. acknowledging receipt of a handover message for inter-cell mobility.

According to some aspects of the disclosure there is a method for inter-cell mobility management that includes transmitting, by a network via a source cell to a user equipment UE, higher-layer signaling (i.e. a higher-layer message) including configuration information for measuring RRM-RS, transmitting, by the network via the source cell to the UE, at least one of a L1 and a L2 message comprising additional configuration information for enabling the UE to measuring RRM-RS from at least one identified neighbor cell, the at least one of the L1 and the L2 message enabling the UE to perform at least one of various inter-cell mobility management methods. Examples of such inter-cell mobility management methods include acquiring system information from at least one identified neighbor cell for inter-cell mobility, updating system information for the at least one identified neighbor cell for inter-cell mobility, radio link monitoring (RLM) for the at least one identified neighbor cell for inter-cell mobility; and an uplink transmission mechanism for the at least one identified neighbor cell for inter-cell mobility (i.e. acknowledging receipt of a handover message of a handover message).

According to some aspects of the disclosure, there is a method for performing inter-cell mobility management. The method includes receiving, by a user equipment (UE) from a network via a source cell, a higher-layer signaling comprising configuration information for measuring radio resource management reference signals (RRM-RSs) sent by the network via neighbor cells. The method also includes receiving, by the UE from the network via the source cell, at least one of a Layer 1 (L1) and a Layer 2 (L2) signaling including additional configuration information for enabling the UE to measure a RRM-RS received from the network via an identified neighbor cell of the neighbor cells and to acquire system information for inter-cell mobility from the network via identified neighbor cell or to update system information of the UE for inter-cell mobility.

The addition configuration information may enable the UE to at least one of: perform radio link monitoring (RLM) for the identified neighbor cell for inter-cell mobility or transmit an acknowledgment to the network via the identified neighbor cell for inter-cell mobility to acknowledge receipt of a handover message for inter-cell mobility.

The method may also include receiving, by the UE, the RRM-RS from the network via the identified neighbor cell; measuring, by the UE, the received RRM-RS based on the additional configuration information included in the received at least one of the L1 and the L2 signaling after the UE synchronizes with the network via the identified neighbor cell based on the received RRM-RS; and acquiring, by the UE, system information from the network via the identified neighbor cell.

The addition configuration information may enable the UE to perform radio link monitoring (RLM) for the identified neighbor cell for inter-cell mobility, and the method may include subsequent to the UE acquiring system information from the network via the identified neighbor cell, resetting, by the UE, a RLM timer and one or more counters based on the additional information included in the received at least one of the L1 and the L2 signaling; receiving, by the UE, a RRM-RS from the network via identified neighbor cell; and measuring, by the UE, the received RRM-RS received from the network via the identified neighbor cell for RLM based on additional configuration information included in the received at least one of L1 and L2 signaling.

The additional configuration information may enable the UE to update system information for the identified neighbor cell and the method may include: receiving, by the UE, a RRM-RS from the network via the identified neighbor cell; measuring, by the UE, the received RRM-RS based on the additional configuration information included in the received at least one of the L1 and the L2 signaling after the UE synchronizes with the network via the identified neighbor cell based on the received RRM-RS; updating the UE based on system information included in the additional configuration information included in the received at least one of the L1 and L2 signaling; and transmitting, by the UE to the network via the identified neighbor cell, an acknowledgement of receipt by the UE of the system information for the identified neighbor cell.

The addition configuration information may further enable the UE to transmit an uplink transmission to the network via the identified neighbor cell for inter-cell mobility to acknowledge receipt of a handover message for inter-cell mobility and the method may include: transmitting, by the UE to the network via the identified neighbor cell, on a physical uplink shared channel (PUSCH) identified in the additional configuration information included in the received at least one of the L1 and the L2 signaling.

The addition configuration information may further enable the UE to transmit an acknowledgement to the network via the identified neighbor cell for inter-cell mobility to acknowledge receipt of a handover message for inter-cell mobility and the method may include transmitting, by the UE, to the network via the identified neighbor cell, a random access (RA) preamble included in additional content information in the received at least one of the L1 and the L2 signaling; and receiving, by the UE from the network via the identified neighbor cell, an RA response to the RA preamble.

The at least one of the L1 and the L2 signaling may include a media access control-control element (MAC-CE) command.

The MAC-CE command may include fields for one or more of: frequency layer information comprising a center frequency for the RRM-RS or absolute radio frequency channel number (ARFCN) and subcarrier spacing; physical cell identifier (PCI); an index value of the RRM-RS; Control Resource Set #0 resource location information; Search Space Set #0 resource location information; physical uplink shared channel (PUSCH) resource allocation; radio link monitoring timer information; radio link monitoring counter information; UE radio network temporary identifier (RNTI); and Random Access (RA) preamble index value.

The MAC-CE command may be received on a physical downlink shared channel (PDSCH).

According to some aspects of the disclosure, there is a device including a processor and one or more computer-readable media, having stored on processor-readable instructions. The processor-readable instructions, when executed by the processor, perform a method for inter-cell mobility management as described above. The device may be a UE, part of a UE, a base station or access station of a source cell, or part of a base station or access station of a source cell.

According to some aspects of the disclosure there is a device including modules or functional units to perform a method or inter-cell mobility management as described above. The device may be a UE, part of a UE, a base station or access station of a source cell, or part of a base station or access station of a source cell.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIGS. 1A, 1B and 1C are schematic drawings of multiple frequency layers in the frequency domain and in a serving cell and neighboring cells that may be used in telecommunication cells.

FIG. 10B is another example of a MAC-CE command for use in inter-cell mobility according to an aspect of the present disclosure.

DETAILED DESCRIPTION OF ILLUSTRATIVE EMBODIMENTS

Figure 1D:
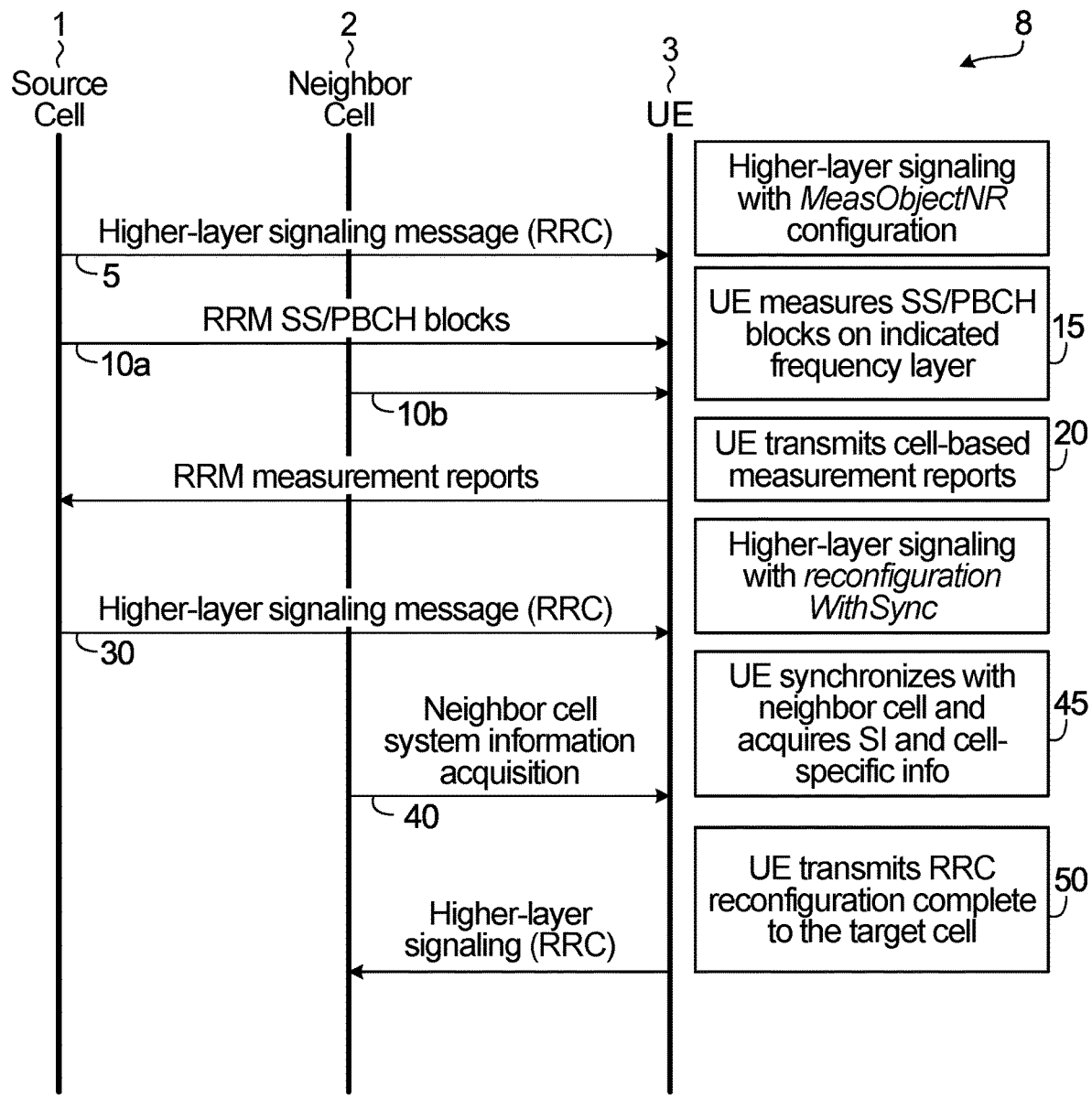
FIG. 1D is a flow diagram illustrating an example of (L3-based methods for inter-cell mobility management currently supported by New Radio (NR).

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The following portion of the disclosure describes an example of a L3-based method for inter-cell mobility management that may be currently used in the New Radio (NR) standard to provide a comparison to the L1/L2-based methods for inter-cell mobility management (hereinafter referred to as L1/L2-based inter-cell mobility management methods) provided by the present disclosure.

UEs are configured to perform RRM measurements on reference signals and report results of those RRM measurements to a wireless network of a wireless communication system. Such functionality is supported using higher-layer signaling (i.e. high-layer messages), which may include one or more information elements (IE) that provide the UE with configuration information regarding a particular reference signal (RS) that the UE should measure. An example of such an IE is a MeasConfigNR object. Each MeasConfigNR object includes a resource configuration (e.g. SS/PBCH blocks and CSI-RS) for the UE to perform RRM measurements on reference signals.

The UE can be configured to connect to the network based on identification of a frequency layer and a cell identifier, such as a physical cell identifier (PCI). A frequency layer is defined as a combination of a center frequency and a subcarrier spacing. A particular example will now be described in which the UE is configured to perform RRM measurements on two frequency layers, where the first frequency layer is referred to in the example as "ssbFrequency1" and the second frequency layer is referred to as "ssbFrequency2". FIG. 1A illustrates an example of two bandwidths in the frequency domain, each bandwidth corresponding to a frequency layer having a respective center frequency and having a subcarrier spacing, where subcarrier spacing denotes the distance in frequency between two subcarriers. The two bandwidths in FIG. 1A are labelled with their corresponding frequency layer "ssbFrequency1" and "ssbFrequency2", respectively.

In the present disclosure, in a wireless communication system using, for example, NR (new radio) radio access technology, there are entities called "synchronization rasters", which are tables of frequencies where a UE can look for synchronization signals (i.e. SS/PBCH blocks). As part of performing a cell search process, the UE scans different frequencies for synchronization signals (i.e. SS/PBCH blocks), attempts to detect synchronization signals (i.e.

SS/PBCH blocks), and detects the PCI of a cell of a coverage area of a network that the UE is in. Depending on a deployment of base stations in a network ("network deployment") and on assumptions that are made as part of the deployment, different SS/PBCH blocks may be transmitted using different subcarrier spacings. Acquiring time and frequency synchronization is a process that the UE may go through as part of Initial Access process performed by the UE and as part of RRM measurement for inter-cell mobility management measurements. When a UE performs measurements on SS/PBCH blocks from neighbor cells, the UE may have to go through the synchronization process again. A purpose of synchronization signals is for the UE to acquire the symbol timing and subcarrier frequency of downlink signals so that the UE knows about the time-frequency resource grid being used by downlink signals.

In the embodiments of the methods and devices of the present disclosure, a "cell" is a geographic region or area where a UE is able to receive reference signals (such as synchronization signals) that are identified using one value of a physical cell identifier. A "base station" is hardware equipment used for wireless networks that transmits and receives wireless signals. Cellular networks, such as radio access networks, are one variant of wireless networks. A cellular network (e.g. a radio access network) provides a coverage area that is divided up into "cells". In the case of NR, the coverage area of a cellular network (e.g. a radio access network) is where the UE is able to detect a SS/PBCH block for a given value of PCI corresponds to a "cell". In typical deployments of cellular networks (e.g. radio access networks), a base station may transmit physical layer signals that correspond to one or more cells, while physical layer signals corresponding to one cell may only be transmitted by one base station. As part of the embodiments for enhanced inter-cell mobility management methods described herein, the terms "source cell" and "serving cell" may be used inter-changeably.

In this example, the UE is configured by the cellular network (e.g. radio access network) to perform measurements on reference signals in the form of SS/PBCH blocks, also known as synchronization signal blocks (SSB). A cell that the UE is currently in, and the UE is being served by that cell, will be referred to as the serving cell and other adjacent cells will be referred to as neighbor cells. The serving cell and the neighbor cells each have an associated SSB index for identifying a reference signal from a group of reference signals having associated indices, and a PCI. The UE performs RRM measurements on both of the frequency layers and transmits measurement reports for SSBs the UE is able to detect. These measurement reports carry cell-based quality reports.

FIG. 1B illustrates an example of a serving cell and six neighboring cells using the first frequency layer (ssbFrequency1) and FIG. 10 illustrates seven neighboring cells using the second frequency layer (ssbFrequency2). The cells in FIG. 1B and FIG. 10 are representative of the same physical cells using different frequency layers for communication. The two figures (e.g. FIG. 1B and FIG. 10) are shown separately simply for the sake of explanation and to more clearly describe the labelling of SSB index and PCI value for each respective cell.

The serving cell in FIG. 1B has an SSB Index=0 and PCI=1. Neighbor cell #1 has an SSB Index=2 and PCI=2. Neighbor cell #2 has an SSB Index=3 and PCI=3. Neighbor cell #3 has an SSB Index=5 and PCI=4. Neighbor cell #4 has an SSB Index=7 and PCI=5. Neighbor cell #5 has an SSB Index=8 and PCI=6. Neighbor cell #6 has an SSB Index=9 and PCI=7.

In FIG. 1C Neighbor cell #0 has an SSB Index=0 and PCI=11. Neighbor cell #1 has an SSB Index=1 and PCI=12. Neighbor cell #2 has an SSB Index=2 and PCI=13. Neighbor cell #3 has an SSB Index=4 and PCI=14. Neighbor cell #4 has an SSB Index=5 and PCI=15. Neighbor cell #5 has an SSB Index=6 and PCI=16. Neighbor cell #6 has an SSB Index=9 and PCI=17. The UE is configured to measure SSB indexes {0, 2, 3, 5, 7, 8, 9} on ssbFrequency1 and SSB indexes {0, 1, 2, 4, 5, 6, 9} on ssbFrequency2.

In both FIGS. 1B and 1C, a UE is shown to be near the edge of the serving cell in close proximity to neighbor cell #1 and neighbor cell #2. After the UE performs an inter-cell mobility management method (i.e. an inter-cell mobility management process) and reports measurement information to the cellular network (hereinafter referred to as network), the network may send a handover command to the UE, instructing the UE that a neighbor cell is to be the new serving cell.

FIG. 1D is a signaling diagram 8 illustrating the signaling between the network (including a source cell 1 that is serving a UE and a neighbor cell 2 of the source cell) and the UE 3 being served. While only a single neighbor is shown in the signaling diagram 8, it is understood there similar signaling may occur between the UE 3 and multiple neighbor cells. Furthermore, the same process (i.e. the process of the UE 3 measuring SS/PBCH blocks sent by the network via neighbor cells) may be occurring for multiple UEs in the network. The network (not shown), via the source cell 1, sends 5 to the UE 3 higher-layer signaling (i.e. a higher-layer message), such as radio resource control (RRC) signaling (i.e. a RRC message) with configuration information for the UE 3. A particular example of such as RRC signaling (i.e. a RRC message) may include a measurement object information element (IE) as part of the configuration message, such as "MeasObjectNR" IE. The "MeasObjectNR" IE is a higher-layer parameter which the network uses to provide configuration to the UE 3 about radio resource management reference signals upon which to perform mobility measurements. The network, via the source cell 1, transmits 10*a* radio resource management (RRM) reference signals (for example SS/PBCHs) and transmits 10*b*, via the neighbor cell 2, RRM reference signals (for example SS/PBCHs). The UE 3 measures 15 signal strength, for example in the form of (e.g. received signal response power (RSRP), signal-to-noise ratio (SNR), received signal strength indicators (RSSI)) of the reference signals sent by the network via the source cell 1 and the neighbor cell 2. The UE 3 sends 20 cell based measurement reports to the network via the source cell 1. The network, via the source cell 1, sends (i.e. transmits) 30 a handover command in higher-layer signaling (i.e., a higher-layer message) to the UE 3, such as RRC signaling (i.e. an RRC message). An example of such RRC signaling (i.e. an RRC message) may include a "reconfigurationWithSync" configuration message. The network, via the neighbor cell 2, transmits 40 neighbor cell system information to the UE 3. The UE 3 synchronizes 45 with the neighbor cell 2 and acquires the system information (SI) and cell-specific information transmitted by network via the neighbor cell 2. The UE 3 sends (i.e. transmits) 50 to the network via the neighbor cell 2 higher-layer signaling (i.e. a higher-layer message), such as RRC signaling (i.e. an RRC message), that indicates the reconfiguration is complete.

After receiving the handover command carrying configuration information for the UE 3 (an example of which is the "reconfigurationWithSync" message), the UE 3 acquires physical layer synchronization with the neighbor cell 2 and acquires system information from the network via neighbor cell 2 (i.e. master information block (MIB)) and cell-specific information (e.g. system information block (SIB1)). Upon completing a Random Access (RA) procedure (i.e. a RA process), the UE 3 sends (i.e. transmits) a RRC reconfiguration complete message to confirm that the HO procedure is complete.

Aspects of the present disclosure pertain to inter-cell mobility management methods (i.e. inter-cell mobility management processes for cells) directly at Layer 1 (L1) or Layer 2 (L2), which use radio resource control (RRC) signaling (i.e. RRC messages), in a manner that reduces latency of inter-cell mobility methods and enhances user experience under mobility (i.e. handover). Inter-cell mobility management methods typically involve the UE explicitly synchronizing at the physical layer with a neighbor cell, also referred to as a target cell (the cell the UE is being handed over to) and acquiring system information and cell information before the network via the target cell can start sending physical downlink control channel (PDCCH) transmissions that schedule physical downlink shared channel (PDSCH) transmissions carrying UE-specific data.

One example of an inter-cell mobility management method provided by the present disclosure (referred to as an L1/L2-based inter-cell mobility management method) allows the UE to acquire system information from neighbor cells during L1-based RRM measurements. Another example of an L1/L2-based mobility management method of the present disclosure allows the network to semi-statically activate/deactivate frequency layers and indicate resources used by given neighbor cells in order to update system information in a user-centric manner.

Figure 2:
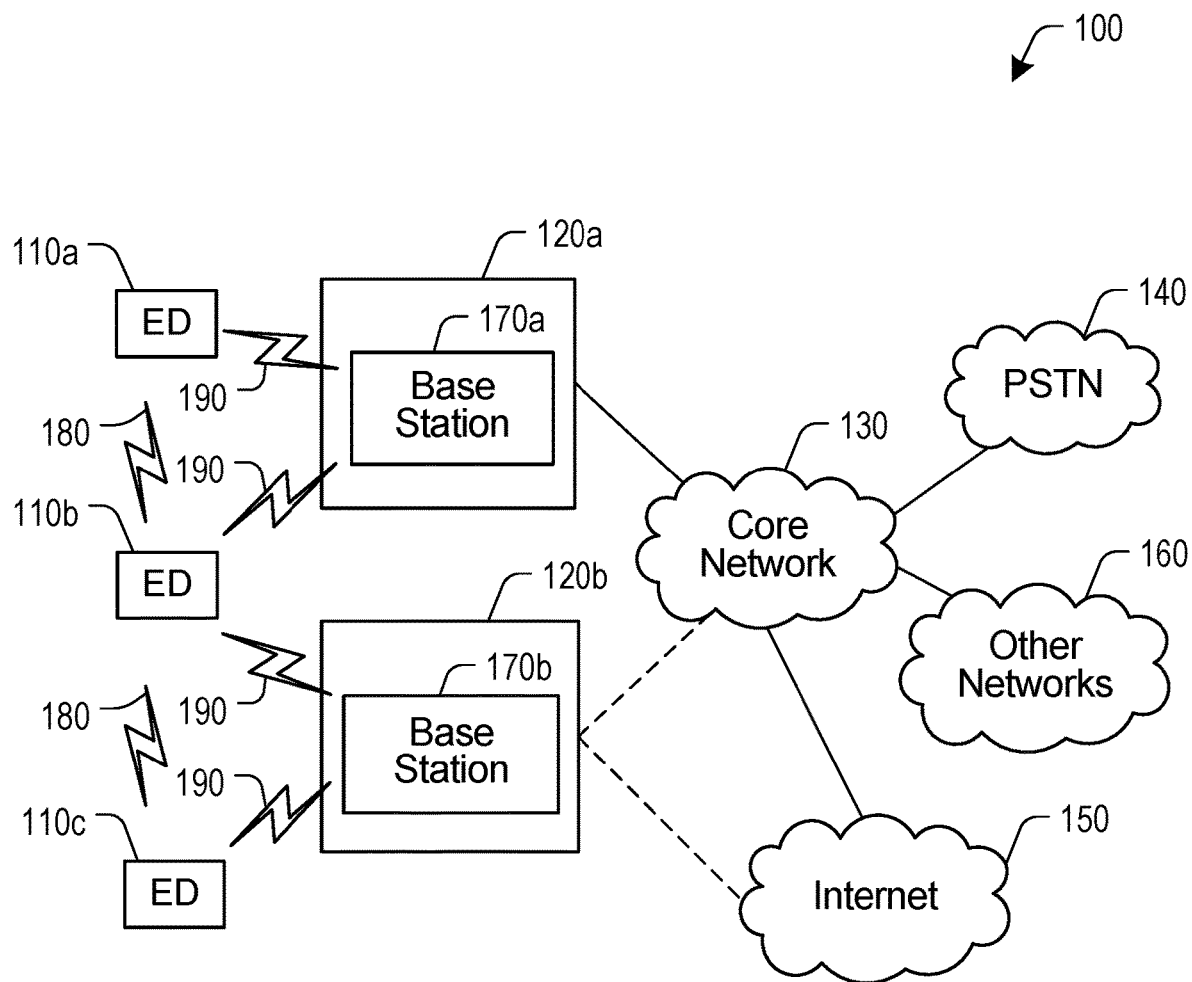
FIG. 2 is a schematic diagram of a communication system in which embodiments of the disclosure may occur.
Figure 3A:
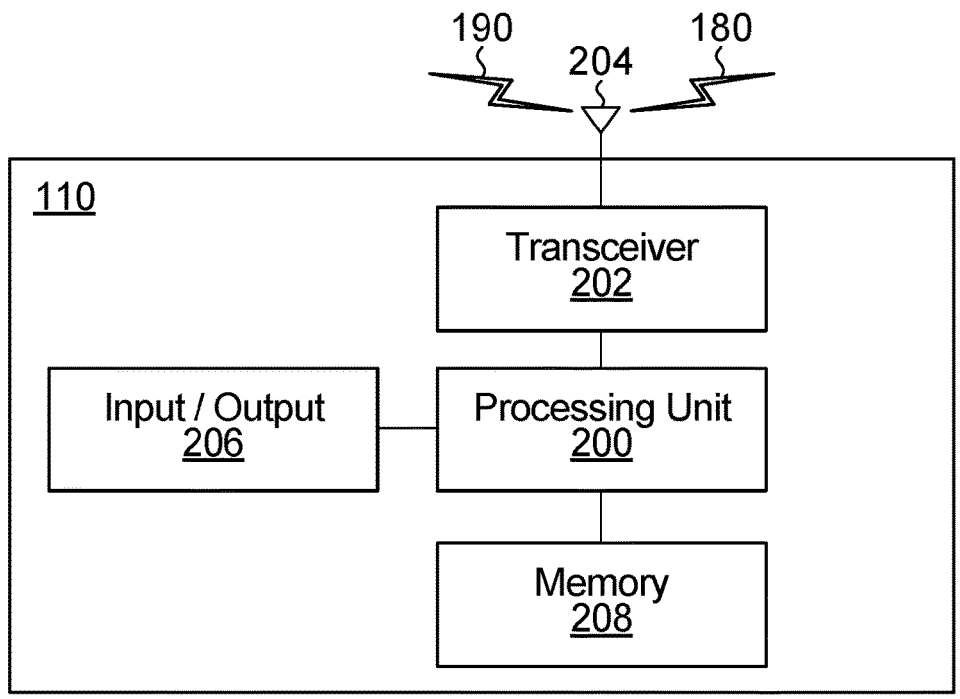
FIGS. 3A and 3B are block diagrams of an example user equipment and base station, respectively, in which embodiments of the disclosure may occur.
Figure 3B:
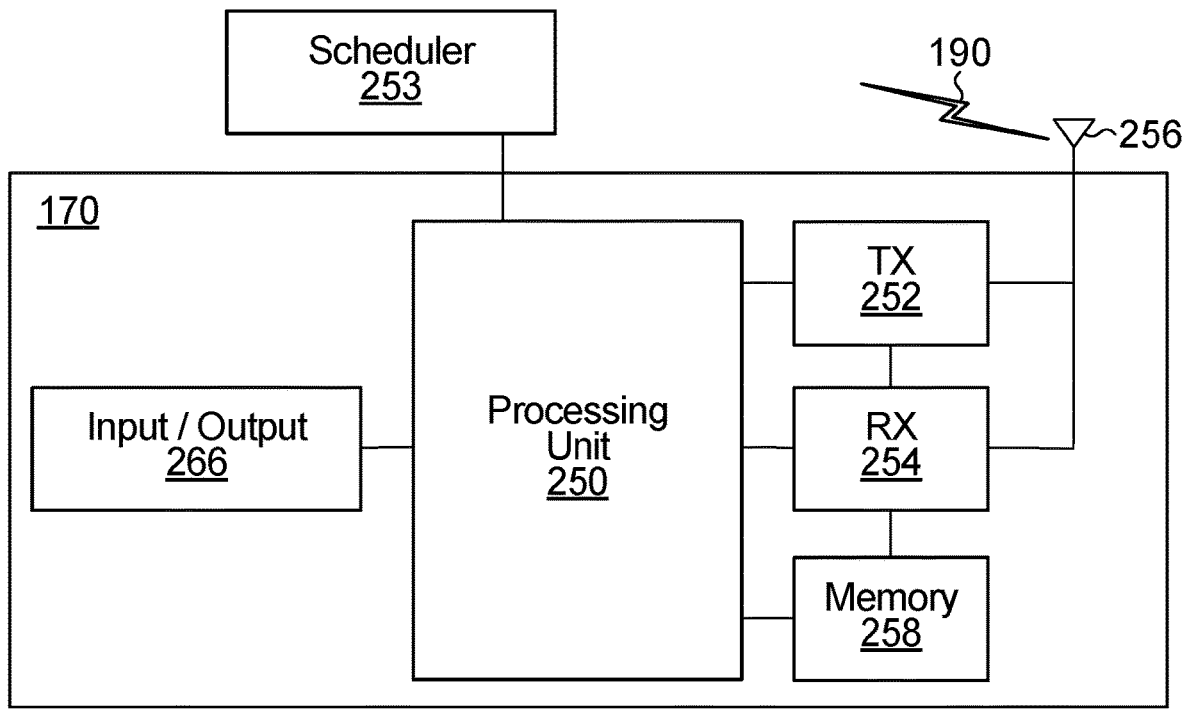

FIGS. 2, 3A, and 3B provide context for the network and devices of a wireless communication system that may implement aspects of the inter-cell mobility management methods of the present disclosure.

FIG. 2 illustrates an example wireless communication system 100 (hereinafter referred to as system 100) which includes a network in which embodiments of the inter-cell mobility management methods of present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In the example shown in FIG. 2, the system 100 includes electronic devices (ED) 110a-110c (generally referred to as ED 110), radio access networks (RANs) 120a-120b (generally referred to as RAN 120), a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both wireless signals via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device. The EDs 110a-110c are examples of UEs in FIGS. 1B, 1C, and 1D above, as well as UEs 443, 553, 653, 753, 853, 903, 1003, in the FIGS. 4B, 5B, 6B, 7B, 8B, 9A, and 10A described below.

In FIG. 2, the RANs 120a-120b include base stations 170a-170b, respectively. Each base station 170a-170b (generally referred to as base station 170) is configured to wirelessly interface, access or communicate with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The base stations of the RANs 120, such as base station 170a of the RAN 120a and the base station 170b of the RAN 120b can access the core network 130 via the internet 150, as shown.

The EDs 110a-110c and base stations 170a-170b are examples of communication equipment, devices, or apparatuses that can be configured to implement some or all of the functionality and/or embodiments of the inter-cell mobility management methods described herein. In the embodiment shown in FIG. 2, the base station 170a forms part of the RAN 120a (i.e. is included in the RAN 120a), and the RAN 120a may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of (i.e. is included in) the RAN 120b, and the RAN 120b may include other base stations, elements, and/or devices. Each base station 170a-170b transmits and/or receives wireless signals within a particular geographic region or area, sometimes referred to as a "cell". A cell may be further divided into sectors, and a base station 170a-170b may, for example, employ multiple transceivers to provide service to multiple sectors. Base stations, such as base stations 170a-170b, are examples of communication equipment, devices or apparatuses that are used to provide the source cell and neighbor cells in FIGS. 1B, 1C and 1D, as well as figures below. In some embodiments, pico or femto cells may be established by the base stations 170 of a RAN where the radio access technology supports such use-cases based on heterogeneous network deployments. In some embodiments, multiple transceivers could be used for each cell, for example using multiple-input multiple-output (MIMO) technology. The number of RANs shown in FIG. 2 is exemplary only. Any number of RANs may be included in the system 100 by a network service provider.

The base stations 170a-170b wirelessly interface, access, or communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Uplink Packet Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such methods as described above. Other radio access technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access methods and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c may also wirelessly interface, access or communicate with one another over one or more SL air interfaces 180 using wireless communication links e.g. radio frequency (RF), microwave, infrared (IR), etc.

In addition, some or all of the EDs 110a-110c may include functionality for communicating with different wireless networks over different wireless links using different wireless technologies and/or protocols. Instead of wireless communication (or in addition thereto), the EDs 110a-110c may communicate via wired communication channels to a network service provider (not shown) or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies and incorporate multiple transceivers necessary to support multiple radio access technologies.

FIGS. 3A and 3B illustrate example devices that may implement the inter-cell mobility management methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments of the inter-cell mobility management methods described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC) (not shown). The transceiver 202 is also configured to demodulate data or other content received by the at least one antenna 204. Each transceiver 202 includes any suitable structure for generating signals for wireless transmission by the antenna 204 or wired transmission by the NIC (not shown) and/or processing signals received wirelessly by the antenna 204 or received by wire by the NIC (not shown). Each antenna 204 includes any suitable structure for transmitting and/or receiving wireless signals and/or each NIC (not shown) includes any suitable structure for transmitting and/or receiving wired signals. One or multiple transceivers 202 could be used (i.e. included) in the ED 110. One or multiple antennas 204 could be used (i.e. included) in the ED 110. Although shown as a single functional unit, a transceiver 202 could also be implemented using at least one transmitter and at least one separate receiver.

The ED 110 further includes one or more input/output devices 206 or other interfaces (such as a wired interface to the internet 150). The input/output devices 206 may enable a user to interact with the ED 110. Each input/output device 206 includes any suitable structure for providing information to or receiving information from a user. Examples of input/output devices 206 include a speaker, microphone, keypad, keyboard, display, or touch screen, and the suitable structure may be a communications interface, such as a peripheral bus. The other interfaces of the ED 110 may enable the ED 110 to interact, access, or communicate with other devices via the Internet 150, such as other EDs 110, servers, a cloud computing platform, and the like.

In addition, the ED 110 includes at least one memory 208. The memory 208 stores instructions and data used, generated, or collected by the ED 110. For example, the memory 208 could store software instructions that implement some or all of the functionality and/or embodiments of the inter-cell mobility management methods described above and that are executable by the processing unit(s) 200. Each memory 208 includes any suitable volatile storage and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices 266 or other interfaces (not shown). A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more EDs 110, or wired transmission to other base stations 170, the core network 130, or the Internet 150. Each receiver 254 includes any suitable structure for processing signals received wirelessly from one or more EDs or received via wire from other base stations 170, the core network 130, or the Internet 150. Although shown as separate components, at least one transmitter 252 and at least one receiver 254 could be combined into a single component, generally known as a transceiver. Each antenna 256 includes any suitable structure for wireless transmitting signals received from the transmitter 252 and/or receiving wireless signals from EDs 110. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores software instructions and data used, generated, or collected by the base station 170. For example, the memory 258 could store software instructions that implement some or all of the functionality and/or embodiments of the inter-cell mobility management methods described above and that are executable by the processing unit(s) 250.

Each input/output device 266 enables a user to interact with the base station 170. Each input/output device 266 includes any suitable structure for providing information to or receiving/providing information from a user, such as a peripheral bus. The other interfaces of the base station 170 may enable the base station 170 to interact, access, or communicate with other devices via the Internet 150, such as other EDs 110, servers, a cloud computing platform, and the like.

Additional details regarding the UEs 110 and the base stations 170 are known to those of skill in the art. As such, these details are omitted here for clarity.

As described above, current inter-cell mobility management methods use an L3-based signaling. For example, a handover (HO) command using an RRC signaling (i.e. RRC message) carrying a "reconfigurationWithSync" parameter. There are currently no L1/L2-based methods for inter-cell mobility management for updating cell-specific system information. Examples of cell-specific system information may include, but is not limited to, System Frame Number, Control Resource Set (CORESET) #0, SearchSpace #0. System Frame Number is a number associated with timing synchronization. The CORESET is a set of time/frequency (i.e. time and frequency) physical resources used for carrying a PDCCH and downlink control information (DCI). Search Space is a particular set of time/frequency physical resources that a UE is notified to search to find PDCCHs scheduling PDSCH transmissions carrying SI messages such as system block information (SIB1). There are also no L1/L2-based methods for inter-cell mobility management for acquiring critical cell-specific system information outside of Initial Access or HO. Presently, a UE decodes the master information block (MIB) only upon HO command reception (i.e. reception of a HO command) or upon performing a cell search process as part of Initial Access. In addition, there are no L1/L2 acknowledgement mechanisms that use media access control-control element (MAC-CE) commands in inter-cell mobility management methods. Presently, a UE transmits HARQ-ACK feedback for a PDSCH carrying a MAC-CE command.

To address some of the limitations of existing L3-based inter-cell mobility management methods described in the preceding paragraph, embodiments of the present disclosure aid in acquiring system information from neighbor cells for inter-cell mobility, updating system information for neighbor cells for inter-cell mobility, radio link monitoring (RLM) for inter-cell mobility and uplink transmission mechanism for inter-cell mobility for acknowledging receipt of a handover message for inter-cell mobility.

The physical arrangement of serving cell and neighbor cells for first and second frequency layers shown in FIGS. 1A, 1B and 1C will now also be used in describing various embodiments of the present disclosure. While the PCIs and SSB indices are the same for all the examples shown in FIGS. 1A, 1B and 1C, it should be known that this is not intended to limit the scope of the disclosure. Different numbering of PCIs and SSB indices would be expected in various implementations of network deployments.

System Information Acquisition from Neighbor Cells for Inter-Cell Mobility

This embodiment is applicable to scenarios where the UE is switching between different frequency layers and performing an inter-cell mobility management method from a source cell to one or more neighbor cells, as well as to scenarios where the UE is switching between cells with different PCIs on the same frequency layer. The UE is notified by the network as to which neighbor cell or neighbor cells the UE should be monitoring or measuring reference signals for, and proceeds to acquire system and cell-specific information for those cell or cells.

Network side behavior in this embodiment of mobility management method involves the network sending a PDSCH transmission including lower-layer signaling, such as L1 signaling (i.e. L1 message) or L2 signaling (i.e. L2 message). An example of such lower layer signaling (i.e. lower-layer message) is a MAC-CE command. The MAC-CE command carries configuration information about the frequency layer and the reference signals and corresponding PCIs that the UE should monitor on a given frequency layer.

Figure 4A:
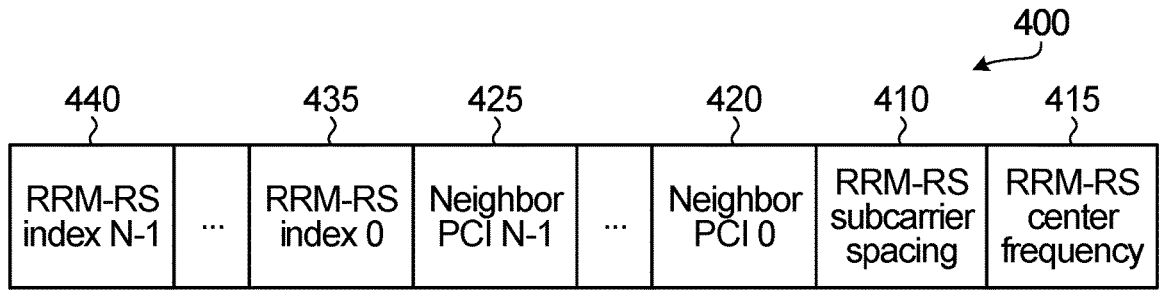
FIG. 4A is an example of a media access control-control element (MAC-CE) command for use in enabling system information acquisition from neighbor cells for inter-cell mobility according to an aspect of the present disclosure.

An example of a MAC-CE command 400 is shown in FIG. 4A. The example MAC-CE command 400, and other MAC-CE commands described below in other examples, are schematic diagrams representing various fields, made up of one or more bits, that are included in the MAC-CE commands. The MAC-CE command 400 contains (i.e. carries) configuration information about a frequency layer, PCIs and reference signal indexes used to configure the UE that receives the command. The frequency layer is identified in the MAC-CE command 400 by a radio resource management reference signal (RRM-RS) center frequency field 415 and a RRM-RS subcarrier spacing field 410. The PCIs are identified in the MAC-CE command 400 by Neighbor PCI 0 field 420 to Neighbor PCI N−1 field 425. In some embodiments, the MAC-CE command may include a number of neighbor PCI fields that correspond only to the number of neighbor cells that the network is notifying the UE to monitor and be identified by a respective PCI. In some embodiments, the MAC-CE command 400 may include a number of single bit fields that correspond to all the possible neighbor cells of the serving cell, where, for example, the neighbor cells to be monitored are single bit fields identified with a "1" bit, while single bit fields with a "0" bit are not monitored. The reference signal indices are identified in the MAC-CE command 400 by RRM-RS index 0 field 435 to RRM-RS index N−1 field 440. In some embodiments, the MAC-CE command 400 may include a number of the RRM-RS index fields that correspond only to a particular index that the network is telling the UE to monitor for a given PCI. In some embodiments, the MAC-CE command 400 may include a number of single bit fields that correspond to all the possible RRM-RS indices for a given PCI and the RRM-RS indices to be measured are single bit fields with a "1" bit, while single bit fields with a "0" bit are not measured. FIG. 4A is a particular example of a MAC-CE command, but other examples of a MAC-CE command may include additional fields. Other examples of a MAC CE command may include the fields of the MAC CE command 400 shown in FIG. 4A but arranged in different order, or may include multiple instances of the same field of the MAC CE command 400. For example, there may be a concatenated set of fields identifying each PCI and the RRM-RS for that PCI.

The UE behavior involves, based on the configuration information sent in the MAC-CE command 400, the UE detecting and measuring reference signals that are on the indicated frequency layer and are associated to the indicated PCIs. For reference signals whose corresponding identification field is set to 0, the UE does not attempt to detect or measure the reference signals. For reference signals whose corresponding identification field is set to 1, the UE attempts to detect and measure the reference signals. For each of the reference signals that the UE is able to detect, the UE acquires the corresponding system information. System information (SI) includes information found in the MIB, such as the system frame number (SFN), CORESET #0 and SearchSpaceSet #0. The UE may also acquire cell-specific information, e.g. initial bandwidth part (BWP) configuration, common CORESETs, common search space sets, etc., using PDSCH transmissions carrying MAC-CE commands.

In a particular example demonstrating this embodiment, referring to the physical cells shown in FIGS. 1B and 1C, the UE is synchronized at the physical layer on frequency layer 1 in the source cell using PCI=1. The UE is configured by the network to perform RRM measurements on the reference signals on frequency layer 1 (i.e. ssbFrequency 1 and subcarrierSpacing1) and frequency layer 2 (i.e. ssbFrequency 2 and subcarrierSpacing1). As in FIGS. 1B and 1C, the UE is on the edge of the serving cell with PCI=1 and in close proximity to Neighbor cell #1 with PCI=2 and Neighbor cell #2 with PCI=3 in frequency layer 1 (as shown in FIG. 1B) and Neighbor cell #0 with PCI=11, Neighbor cell #1 with PCI=12 and Neighbor cell #2 with PCI=13 in frequency layer 2 (as shown in FIG. 1C).

The network sends a MAC-CE command, such as MAC-CE command 400, to the UE in a PDSCH. The MAC-CE command 400 carries an indication for the UE to synchronize on frequency layer 2 and to neighbor cells using PCI=12 and PCI=13. The UE sends an acknowledgement of the PDSCH carrying the MAC-CE command 400 to the network within a determined time. In some examples, the determined time indicated here is a processing delay needed by the UE to process the data block in the PDSCH transmission and send the processed data block to the MAC layer. This processing delay is known to both the network and the UE and allows the network and the UE to have a mutual understanding about when the MAC-CE command (e.g. MAC-CE command 400) is going to be applied by the UE. As a non-limiting example, in 5G systems (i.e. systems 100) based on NR, this processing delay is specifically stated in the 5G specification as being equal to 3 ms. After acknowledging the MAC-CE command 400, the UE uses the configuration information contained in the MAC-CE command (e.g. MAC-CE command 400) to perform L1 RRM measurements on reference signals (e.g. SS/PBCH blocks) associated with the PCIs and the frequency layer indicated in the MAC-CE command 400. The UE then acquires physical layer synchronization with the neighbor cells using the PCIs and the frequency layer indicated in the MAC-CE command (e.g. MAC-CE command 400) and acquires system information associated to the PCIs indicated in the MAC-CE command (e.g. MAC-CE command 400).

Figure 4B:
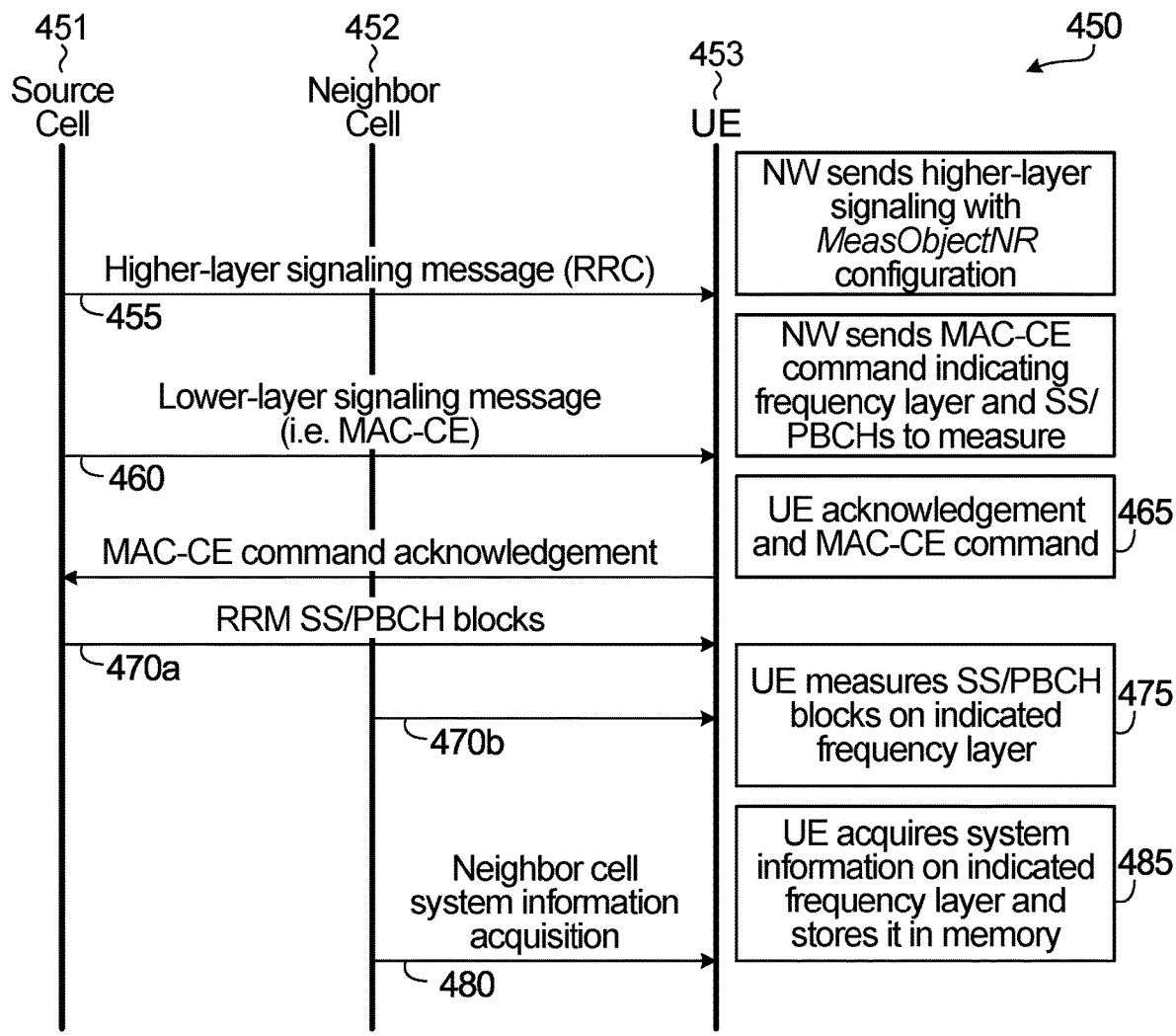
FIG. 4B is a flow diagram illustrating an example process of using Layer 1/Layer 2 (L1/L2) signaling for enabling system information acquisition from neighbor cells for inter-cell mobility according to an aspect of the present disclosure.

FIG. 4B is an example signaling diagram 450 of signaling (i.e. messages) being exchanged between the network (via a source cell 451 that is serving one or more UEs and a neighbor cell 452 of the source cell 451) and one UE 453 of the one or more UEs being served by source cell 451, as well as behavior in response to having received signaling (i.e. messages) from the network. The network (indicated by NW in FIG. 4B) via the source cell 451 sends 455 a higher-layer signaling (i.e. a higher-layer message) to the UE 453, such as RRC signaling (i.e. a RRC message) with configuration information for the UE 453 (i.e. that includes configuration information for the UE 453), which may include a MeasObjectNR configuration. The higher-layer signaling (i.e. the higher-layer message) may be Layer 3 (L3) signaling (i.e. a L3 message). The network via the source cell 451 sends 460 lower-layer signaling (i.e. a lower-layer message), in the form of L1 signaling (i.e. a L1 message) or L2 signaling (i.e. a L2 message), to the UE 453, such as a MAC-CE command (e.g. MAC-CE command 400) that includes an identification of frequency layer and SS/PBCHs to measure. The UE 453 sends 465 a MAC-CE command acknowledgement to the network via the source cell 451 indicating that the UE 453 has successfully received the MAC-CE command. The network via the source cell 451 sends 470a radio resource management (RRM) SS/PBCHs and the network via the neighbor cell 452 sends 470b radio resource management SS/PBCHs. Based on the MAC-CE command, the UE 453 measures 475 the SS/PBCHs sent by the network via the source cell 451 and the SS/PBCHs sent by the network via the neighbor cell 452. Prior to the measuring of the RRM SS/PBCHs, the UE 453 acquires time/frequency synchronization with the neighbor cell in order to be able detect and measure the SS/PBCH block. The network via the neighbor cell 452 broadcasts 480 system information as part of radio resource management SS/PBCHs. The UE 453 acquires 485 system information broadcast by the neighbor cell 452 and stores the acquired system information in memory 208.

System information acquisition by the UE 453 (i.e. the acquisition of system information by the UE 453) from neighbor cells for inter-cell mobility management as described above enables efficient inter-cell mobility management methods. The UE 453 acquires physical layer synchronization and essential system information (e.g. MIB/SIB1) corresponding to indicated neighbor cells as part of RRM measurement, allowing the UE 453 to experience smoother inter-cell mobility (i.e. handover) by simplifying the cell search process to just acquiring time and frequency synchronization.

System information acquisition by the UE 453 (i.e. the acquisition of system information by the UE 453) from neighbor cells also may lower UE power consumption. The UE may be configured with measurement objects, which include reference signals for RRM measurements. Some embodiments of the disclosure allow the UE to narrow down RRM measurement processing (i.e. narrow down processing of RRM measurements) to a given set of variables such as frequency layer, PCIs, and reference signal indexes indicated by a MAC-CE command (e.g. MAC-CE command 400), thus reducing UE power consumption by detecting and measuring only reference signals indicated by the MAC-CE command.

Embodiments described above pertaining to system information acquisition by the UE 453 (i.e. acquisition of system information by the UE 453) from neighbor cells may simplify the inter-cell mobility management method by introducing two additional steps during RRM measurement. A first additional step involves the network transmitting an indication to the UE about the frequency layer, reference signals and PCIs that the UE is instructed to measure for RRM. A second additional step involves the UE detecting the indicated reference signals associated to the indicated PCIs on the indicated frequency layer and acquiring system information (i.e. MIB) and cell-specific information (i.e. SIB1).

The two additional steps during RRM measurement constitute a simplified cell search process. A cell search process typically involves acquiring time and frequency synchronization as well as detecting the PCI of a cell. The two additional steps mentioned above allow the UE to skip the PCI detection part of the cell search process as the PCI information is directly supplied to the UE by the network, leaving the UE to only acquire time and frequency synchronization.

System Information Update for Neighbor Cells for Inter-Cell Mobility

This embodiment is applicable to scenarios where the UE may be switching between cells with different PCIs on the same frequency layer. The network indicates to the UE which of one or more neighbor cells the UE should monitor and acquire system and cell-specific information for from those cells.

Network side behavior involves the network sending a PDSCH transmission including lower-layer signaling, such as L1 signaling (i.e. a L1 message or L2 signaling (i.e. L2 message) to the UE. An example of such lower-layer signaling (i.e. lower-layer message) is a MAC-CE command. The MAC-CE command carries (i.e. contains or includes) configuration information identifying the frequency layer and PCIs that the UE should monitor on that frequency layer.

Figure 5A:
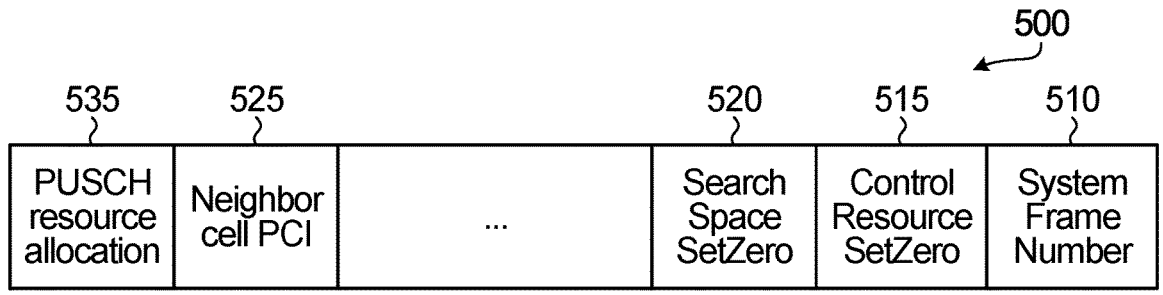
FIG. 5A is an example of a MAC-CE command for use in enabling system information update for neighbor cells for inter-cell mobility according to an aspect of the present disclosure.

An example of a MAC-CE command 500 is shown in FIG. 5A. The MAC-CE command 500 contains configuration information in respective fields pertaining to a SFN, CORESET #0, SearchSpaceSet #0, a neighbor cell PCI and an UL resource allocation (e.g. PUSCH). The SFN is identified in the MAC-CE command 500 by System Frame Number field 510. The CORESET #0 is identified in the MAC-CE command 500 by Control Resource Set Zero field 515. The SearchSpaceSet #0 is identified in the MAC-CE command 500 by Search Space Set Zero field 520. The PCIs are identified in the MAC-CE command 500 by Neighbor Cell PCI field 525. The UL resource allocation is identified in the MAC-CE command 500 by PUSCH resource allocation field 535. The blank section between Space Set Zero field 520 and Neighbor Cell PCI field 525 in FIG. 5A could be used for additional sets of Neighbor Cell PCI and PUSCH resource allocation information for other Neighbor Cell PCIs. FIG. 5A shows a particular example of a MAC-CE command, but other examples of a MAC-CE command may include additional fields. Alternatively, other examples of the MAC-CE command may include the fields shown in the MAC-CE command 500 of FIG. 5A but arranged in a different order, or may include multiple instances of the same field (e.g. per neighbor cell) of the MAC CE command 500. For each neighbor cell whose PCI is indicated, the MAC-CE command (e.g. the MAC-CE command 500) can carry SFN, CORESET #0, SS #0 parameters associated to a given PCI. In some embodiments, the MAC-CE command (e.g. the MAC-CE command 500) may include a number of neighbor PCI fields that correspond only to the number of neighbor cells that the network is notifying the UE to monitor and be identified a respective PCI. In some embodiments, the MAC-CE command (e.g. the may include a number of single bit fields that correspond to all the possible neighbor cells of the serving cell, where, for example, the neighbor cells to be monitored are single bit fields identified with a "1" bit, while single bit fields with a "0" bit are not monitored.

UE side behavior involves, based on the configuration information carried (i.e. contained or included) in the MAC-CE command, for example MAC-CE command 500, the UE updating system information parameters with the configuration information carried in (i.e. contained or included in) the MAC-CE command (e.g. MAC-CE command 500) and acquiring time and frequency synchronization with the neighbor cells whose PCIs are indicated in the MAC-CE command. The UE may also acquire cell-specific information, e.g. initial BWP configuration, common CORESETs, common search space sets, etc., using PDSCH transmissions carrying MAC-CE commands. The MAC-CE commands which include cell-specific information are not to be confused with the MAC-CE commands described herein that are used for L1/L2-based inter-cell mobility management methods.

In a particular example demonstrating this embodiment, referring to the physical cells in FIGS. 1B and 1C, the UE is synchronized on frequency layer 1, in the cell using PCI=1. The UE is configured by the network to perform RRM measurements on frequency layer 1 (i.e. ssbFrequency 1 and subcarrierSpacing1) and frequency layer 2 (i.e. ssbFrequency 2 and subcarrierSpacing1). As in FIGS. 1B and 1C, the UE is on the edge of the serving cell with PCI=1 and in close proximity to Neighbor cell #1 with PCI=7 and Neighbor cell #2 with PCI=3 in frequency layer 1 (as shown in FIG. 1B) and Neighbor cell #0 with PCI=11, Neighbor cell #1 with PCI=12 and Neighbor cell #2 with PCI=13 in frequency layer 2 (as shown in FIG. 1C).

The network sends a MAC-CE command (e.g. MAC-CE command 500) to the UE, carrying an indication to update system information, such as a SFN, CORESET #0, SearchSpaceSet #0, Cell Access information such as a neighbor cell PCI and an UL resource allocation (e.g. PUSCH), etc. Other information such as UE identifiers (e.g. cell radio network temporary identifier (C-RNTI)), neighbor cell PCI, UL resources for UL transmission to neighbor cell, can also be included in the MAC-CE command (e.g. MAC-CE command 500). The UE sends an acknowledgement of the PDSCH carrying the MAC-CE command (e.g. MAC-CE command 500) to the network within a determined time, which is a processing time described above. After acknowledging the MAC-CE command (e.g. MAC-CE command 500), the UE uses the configuration information contained (i.e. included) in the MAC-CE command (e.g. MAC-CE command 500) to update the system information parameters of the UE with the values of the fields in the MAC-CE command (e.g. MAC-CE command 500) received in the MAC-CE command (e.g. MAC-CE command 500). The UE also acquires time and frequency synchronization with the neighbor cells the UE is configured to monitor using the indicated PCIs in the MAC-CE command (e.g. MAC-CE command 500). The UE transmits an UL transmission (e.g. a random access channel (RACH) or physical uplink shared channel (PUSCH)) to the neighbor cells on the indicated UL resources to notify the neighbor cell of the UE's reception of the MAC-CE command from the serving cell.

Figure 5B:
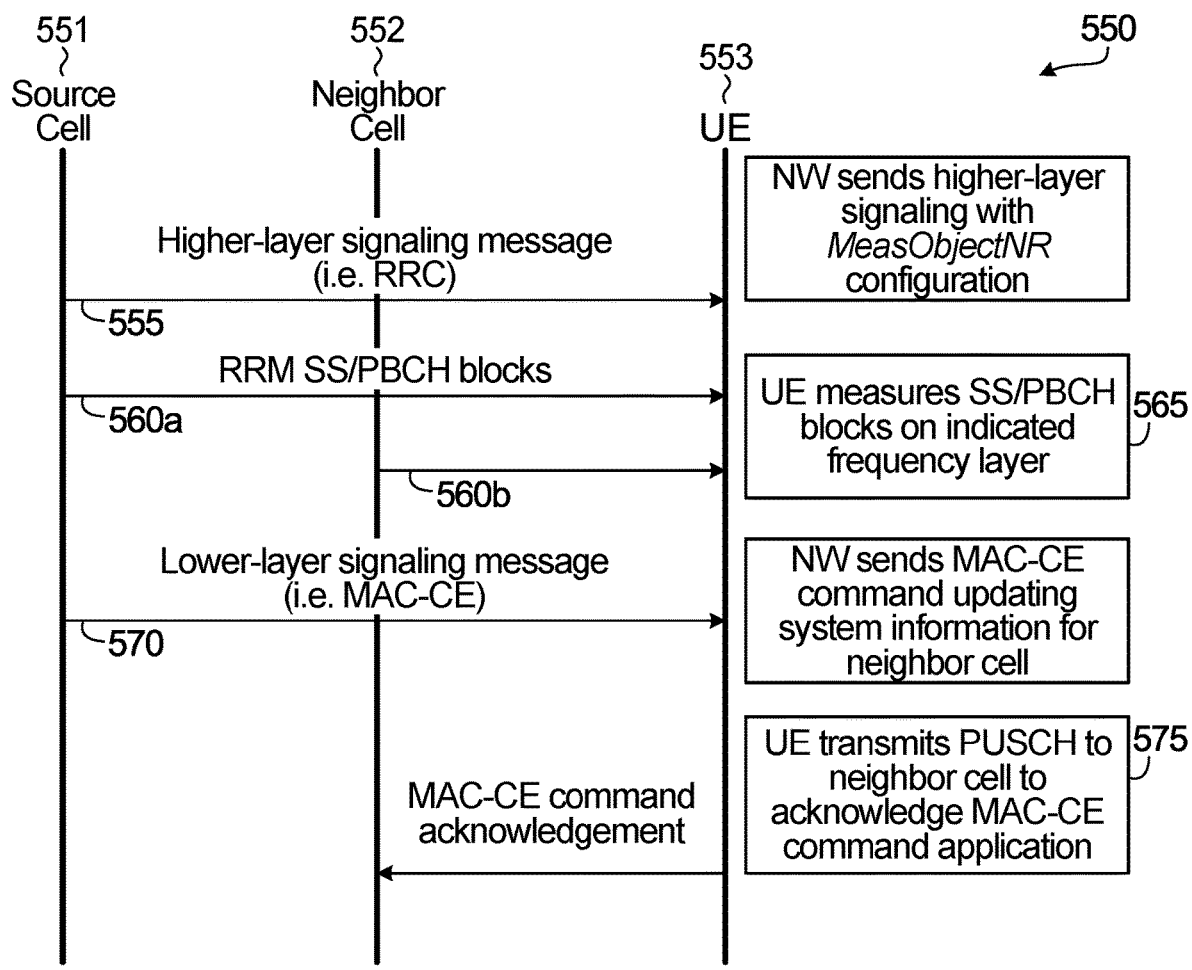
FIG. 5B is a flow diagram illustrating an example process of using Layer 1/Layer 2 (L1/L2) signaling for enabling system information update for neighbor cells for inter-cell mobility according to an aspect of the present disclosure.

FIG. 5B is an example signaling diagram 550 of signaling (i.e. messages) being exchanged between the network (via a source cell 551 that is serving one or more UEs and a neighbor cell 552 of the source cell 551) and one UE 553 of the one or more UEs being served by the source cell 551, as well as behavior in response to having received messages from the network. The network (indicated by NW in FIG. 5B) via the source cell 551 sends 555 higher-layer signaling (i.e. a higher layer message) to the UE 553, such as RRC signaling (i.e. a RRC message) with (i.e. that contains or includes) configuration information for the UE 553, which may include a MeasObjectNR configuration. The higher-layer signaling (i.e. the higher-layer message) may be Layer 3 signaling (i.e. a Layer 3 message). The network via the source cell 551 sends 560*a* radio resource management reference signals (RRM-RS) (such as SS/PBCH blocks) and sends 560*b* via the neighbor cell 552 RRM-RS. The UE 553 measures 565 the SS/PBCH blocks sent by the source cell 551 and the SS/PBCH blocks sent by the neighbor cell 552. The network via the source cell 551 sends 570 lower-layer signaling (i.e. a lower-layer message), in the form of L1 signaling (i.e. a L1 message) or L2 signaling (i.e. a L2 message), to the UE 553, such as a MAC-CE command (e.g. MAC-CE command 500), to update system information pertaining to the neighbor cell 552. The UE 553 sends 575 a MAC-CE acknowledgement to the network via the neighbor cell 552 (e.g. a TRP corresponding to the neighbor cell) indicating that the UE 553 has successfully received the MAC-CE command (e.g. MAC-CE command 500) from the network via the source cell 551 and that the UE 553 has updated system information to interact with the network via neighbor cell 552.

Embodiments described above pertaining to system information updating for neighbor cells for inter-cell mobility (i.e. updating system information for neighbor cells for inter-cell mobility) may enable efficient inter-cell mobility management methods. In some embodiments, the UE performs simplified cell search by acquiring time and frequency synchronization, skipping the detection of the PCI because the relevant PCIs are provided via the MAC-CE command. This allows the UE to experience smoother inter-cell mobility (i.e. handover) by simplifying the cell search process to acquiring time and frequency synchronization.

System information updating (i.e. updating system information for neighbor cell for inter-cell mobility) in the manner described above may also lower latency of the inter-cell mobility method during mobility (i.e. during handover). The UE is not required to wait for the SS/PBCH block carrying system information (SI) as it is provided directly in the MAC-CE command (e.g. MAC-CE command 500), thus reducing latency the inter-cell mobility method during mobility (i.e. during handover).

Embodiments described above pertaining to system information updating may enable the UE to move between different cells without having to perform a cell search process, i.e. without acquiring time and frequency synchronization or detecting the physical cell identity of the neighbor cell. The network directly supplies all of the necessary system/cell-specific parameters to the UE.

Radio Link Monitoring (RLM) for Inter-Cell Mobility

This embodiment is applicable to scenarios where the UE is switching between different frequency layers and performing targeted mobility, as well as to scenarios where the UE is switching between cells with different PCIs on the same frequency layer. The UE is notified by the network which one or more neighbor cells the UE should be monitoring, the UE proceeds to acquire system/cell-specific information for those one or more cells and the UE then performs radio link monitoring (RLM) for each of the one or more indicated neighbor cells.

Network side behavior involves the network sending a PDSCH transmission to the UE in lower-layer signaling (i.e. in a lower-layer message), such as L1 signaling (i.e. a L1 message) or L2 signaling (i.e. L2 message). An example of such lower-layer signaling is a MAC-CE command. The MAC-CE command may contain or include configuration information pertaining to the frequency layer and PCIs that the UE should be monitoring on the frequency layer.

Figure 6A:
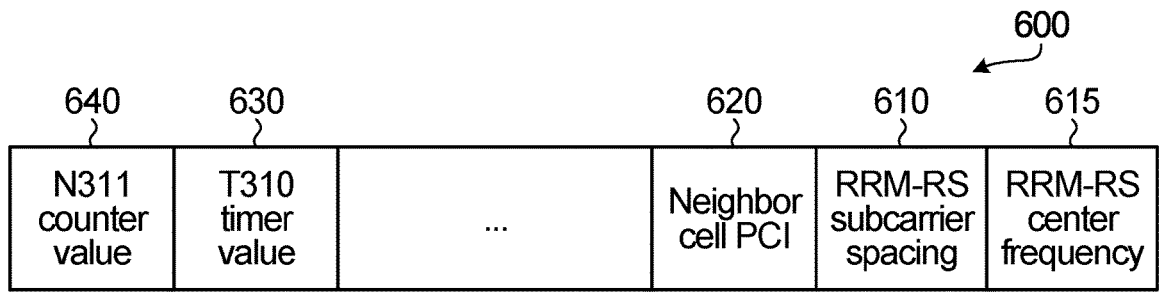
FIG. 6A is an example of a MAC-CE command for use in enabling radio link monitoring (RLM) for inter-cell mobility according to an aspect of the present disclosure.

An example of a MAC-CE command 600 is shown in FIG. 6A. The MAC-CE command 600 contains or includes configuration information about a frequency layer, one or more physical cell identities, reference signal indexes and RLM information such as counter values and timer values used in monitoring a radio link. The frequency layer is identified in the MAC-CE command 600 by RRM-RS center frequency field 615 and RRM-RS subcarrier spacing field 610. The PCIs are identified in the MAC-CE command 600 by Neighbor cell PCI field 620. The timer value is identified in the MAC-CE command 600 by T310 timer value 630. The counter value is identified in the MAC-CE command 600 by N311 timer counter field 640. The blank section between Neighbor Cell PCI 620 and T310 timer value 630 in FIG. 6A could be used for additional sets of Neighbor Cell PCI, T310 timer value and N311 timer counter for other Neighbor Cell PCIs. FIG. 6A is a particular example of a MAC-CE command, but other examples of a MAC-CE command may include other fields, fields of the MAC-CE command 600 but arranged in different order, multiple instances of the same field (e.g. per neighbor cell) of the MAC-CE command 600. For each neighbor cell whose PCI is indicated, the MAC-CE command (e.g. MAC-CE command 600) can carry (i.e. contain or include) RLM parameter fields associated to a given PCI. In some embodiments, the MAC-CE command (e.g. MAC-CE command 600) may include a number of neighbor PCI fields that correspond only to the number of neighbor cells that the network is notifying the UE to monitor and be identified a respective PCI. In some embodiments, the MAC-CE command (e.g. MAC-CE command 600) may include a number of single bit fields that correspond to all the possible neighbor cells of the serving cell, where, for example, the neighbor cells to be monitored are single bit fields identified with a "1" bit, while single bit fields with a "0" bit are not monitored.

UE side behavior involves, based on the configuration sent in the MAC-CE command, for example MAC-CE command 600, the UE detecting and measuring reference signals that are on the indicated frequency layer and are associated to the indicated PCIs. For all the indicated frequency layers, indicated PCIs and indicated reference signals associated with the respective indicated PCIs, the UE carries out radio link monitoring for each of the neighbor cells whose reference signals the UE is able to detect. The UE may also acquire cell-specific information, e.g. initial BWP configuration, common CORESETs, common search space sets, etc., using PDSCH transmissions carrying MAC-CE commands (e.g. MAC-CE command 600).

In a particular example demonstrating this embodiment, the UE is synchronized on frequency layer 1, in the cell using PCI=1. The UE is configured by the network to perform RRM measurements on frequency layer 1 (i.e. ssbFrequency 1 and subcarrierSpacing1) and frequency layer 2 (i.e. ssbFrequency 2 and subcarrierSpacing1). As in FIGS. 1B and 1C, the UE is on the edge of the serving cell with PCI=1 and in close proximity to Neighbor cell #1 with PCI=2 and Neighbor cell #2 with PCI=3 in frequency layer 1 (as shown in FIG. 1B) and Neighbor cell #0 with PCI=11, Neighbor cell #1 with PCI=12 and Neighbor cell #2 with PCI=13 in frequency layer 2 (as shown in FIG. 1C).

The network sends a MAC-CE command (e.g. MAC-CE command 600) to the UE in a PDSCH, the MAC-CE command (e.g. MAC-CE command 600) carrying (i.e. containing or including) an indication to synchronize on frequency layer 2 and to neighbor cells using PCIs 11, 12, 13, and 17. The UE sends an acknowledgement of the PDSCH carrying the MAC-CE command (e.g. MAC-CE command 600) to the network within a determined time, which is a processing time described above. After acknowledging the MAC-CE command (i.e. sending an acknowledgement of the PDSCH carrying the MAC-CE command), the UE uses the configuration information contained or included in MAC-CE command (e.g. MAC-CE command 600) to perform L1 measurements on reference signals (e.g. SS/PBCH blocks) associated with PCIs and the frequency layer indicated in the MAC-CE command (e.g. MAC-CE command 600). The UE acquires physical layer synchronization with the neighbor cells using the PCIs and the frequency layer indicated in the MAC-CE command (e.g. MAC-CE command 600) and acquires system information associated with the PCIs indicated in the MAC-CE command (e.g. MAC-CE command 600). The UE then resets an RLM timer, if the RLM timer is running, and "in-sync" and "out-of-sync" counters that the UE may be maintaining upon applying the MAC-CE command. The RLM timer is a timer used by the UE to monitor RLM indications such as "in-sync" and "out-of-sync", which correspond to periods of time where the radio link quality is above a certain threshold (in-sync) or below a certain threshold (out-of-sync). The RLM counters are counters used by the UE to count RLM indications such as "in-sync" and "out-of-sync".

Figure 6B:
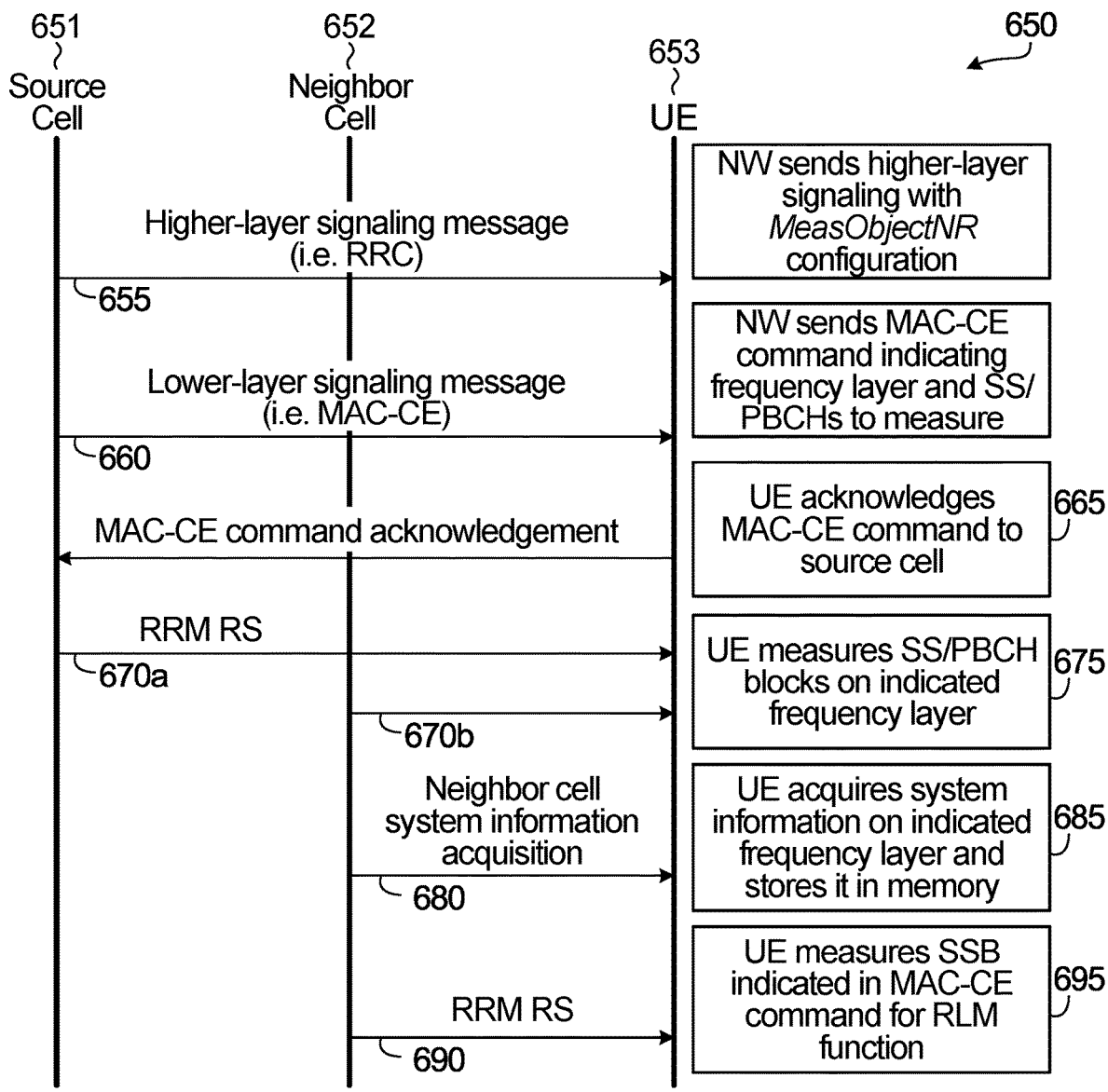
FIG. 6B is a flow diagram illustrating an example process of using L1/L2 signaling enabling radio link monitoring (RLM) for inter-cell mobility according to an aspect of the present disclosure.

FIG. 6B is an example of a signaling diagram 650 of signaling (i.e. messages) being exchanged between the network (via a source cell 651 that is serving one or more UEs and a neighbor cell 652 of the source cell 651) and one UE 653 of the one or more UEs being served by the source cell 651, as well as behavior in response to having received messages (i.e. signaling) from the network. The network (indicated by NW in FIG. 6B) via the source cell 651 sends 655 a higher-layer signaling (i.e. a higher-layer message) to the UE 653, such as RRC signaling (i.e. an RRC message) with configuration information for the UE 653, which may include a MeasObjectNR configuration. The higher-layer signaling (i.e. higher-layer message) may be a Layer 3 signaling (i.e. Layer 3 message). The network via the source cell 651 sends 660 lower-layer signaling (i.e. a lower-layer message), in the form of L1 signaling (i.e. a L1 message) or L2 signaling (i.e. a L2 message), to the UE 653, which may be a MAC-CE command, for example MAC-CE command 600. The MAC-CE command (e.g. MAC-CE command 600) may include frequency layer and RSs (e.g. SS/PBCH blocks) to measure. The UE 653 sends 665 a MAC-CE acknowledgement to the network via the source cell 651 (e.g. a TRP corresponding to the source cell) indicating that the UE 653 has successfully received the MAC-CE command. The network, via the source cell 651, sends 670a RRM-RS, for example RRM SS/PBCH block, and via the neighbor cell 652, sends 670b RRM-RS, for example RRM SS/PBCH blocks. Based on the MAC-CE command (e.g. MAC-CE command 600), the UE 653 measures 675 the RRM-RS (e.g. RRM SS/PBCH blocks) sent by the network via the source cell 651 and the RRM-RS sent by the network via the neighbor cell 652. Prior to the measuring of the RRM-RS (e.g. SS/PBCH blocks), the UE 653b acquires time/frequency synchronization with the neighbor cell 652 in order to be able detect and measure the RRM-RS (e.g. SS/PBCH blocks). The network via the neighbor cell 652 broadcasts 680 system information as part of RRM-RS (e.g. SS/PBCH blocks). The UE 653 acquires 685 the neighbor cell system information on the indicated frequency layer indicated in the MAC-CE command (e.g. MAC-CE command 600) and stores the acquired neighbor cell system information in memory. The network via the neighbor cell 652 sends 690 RRM-RS, for example SS/PBCH block. Based on the MAC-CE command (e.g. MAC-CE command 600), the UE 653 measures 695 the SS/PBCH block sent by the network via the neighbor cell 652 for the RLM function.

Embodiments described above pertaining to RLM for inter-cell mobility may enable efficient inter-cell mobility management methods. In some embodiments, efficient inter-cell mobility management methods involves the UE acquiring physical layer synchronization and essential system information (e.g. MIB/SIB1) as part of (i.e. during) RRM measurement, allowing the UE to experience smoother inter-cell mobility (i.e. handover) by simplifying the cell search process to just acquiring time and frequency synchronization.

Embodiments described above pertaining to RLM for inter-cell mobility may enable faster UE processing of Radio Link Monitoring events from the neighbor cell. In some embodiments, faster UE processing may enable L2-based RLM. RLM timer and constants can be updated or reset, or both upon application of L2-based MAC-CE commands for inter-cell mobility.

Embodiments described above pertaining to RLM for inter-cell mobility may simplify the inter-cell mobility management methods by introducing additional steps during RRM measurement. A first additional step involves the network transmitting an indication to the UE about the frequency layer, reference signals and PCIs that the UE is instructed to measure during RRM measurement. A second additional step involves the UE detecting the indicated reference signals associated to the indicated PCIs on the indicated frequency layer and acquiring system information (i.e. MIB) and cell-specific information (i.e. SIB1).

Embodiments described above pertaining to RLM for inter-cell mobility may enable the UE to move between different cells (i.e. move from one cell to another different cell) and perform radio link monitoring without any interruption at the physical layer.

Using an Uplink Transmission Mechanism for Inter-Cell Mobility

Some embodiments are applicable to scenarios where the UE is switching between different frequency layers and performing targeted mobility, as well as to scenarios where the UE is switching between cells with different PCIs on the same frequency layer. The UE is notified as to which one or more neighbor cells the UE is to monitor and sends an UL transmission to the indicated neighbor cell using the indicated UL PUSCH resources.

Network-side behavior in these scenarios involves the network sending a PDSCH transmission to the UE in lower-layer signaling (i.e. lower-layer message), such as L1 signaling (i.e. L1 message) or L2 signaling (i.e. L2 message). An example of such lower-layer signaling (i.e. lower-layer message) is a MAC-CE command. The MAC-CE command includes configuration information pertaining to the frequency layer and PCIs the UE is indicated to monitor on that frequency layer. The MAC-CE command carries (i.e. contains or includes) configuration information about frequency layers, neighbor cell PCIs, UL PUSCH resources, and other information, for example time advance information.

Figure 7A:
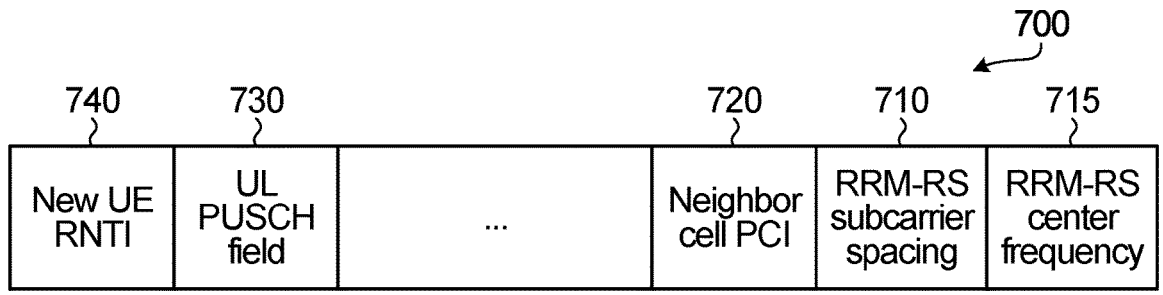
FIG. 7A is an example of a MAC-CE command for use in enabling an uplink transmission mechanism acknowledging receipt of a handover message for inter-cell mobility according to an aspect of the present disclosure.

An example of a MAC-CE command 700 is shown in FIG. 7A. The MAC-CE command 700 carries (i.e. contains or includes) configuration information about a frequency layer, physical cell identities, UL PUSCH fields and UE identifiers. The frequency layer is identified in the MAC-CE command 700 by the RRM-RS center frequency field 715 and the RRM-RS subcarrier spacing field 710. The PCIs are identified in the MAC-CE command 700 by Neighbor cell PCI field 720. The UL PUSCH is identified in the MAC-CE command 700 by UL PUSCH field 730. The UE identifier is identified in the MAC-CE command 700 by New UE RNTI field 740. The blank section between Neighbor Cell PCI 720 and UL PUSCH field 730 in FIG. 7A could be used for additional sets of Neighbor Cell PCI, UL PUSCH and New UE RNTI for other Neighbor Cell PCIs. FIG. 7A is a particular example of a MAC-CE command (e.g. MAC-CE command 700), but other examples of a MAC-CE command may include other fields, the fields of the MAC-CE command 700 arranged in different order, or multiple instances of the same field (e.g. per neighbor cell) of the MAC-CE command 700. For each neighbor cell whose PCI is indicated, the MAC-CE command (e.g. MAC-CE command 700) can carry (i.e. contain or include) UE identifiers and UL PUSCH fields associated to a given PCI. In some embodiments, the MAC-CE command (e.g. MAC-CE command 700) may include a number of neighbor PCI fields that correspond only to the number of neighbor cells that the network is notifying the UE to monitor and be identified a respective PCI. In some embodiments, the MAC-CE command (e.g. MAC-CE command 700) may include a number of single bit fields that correspond to all the possible neighbor cells of the serving cell, where, for example, the neighbor cells to be monitored are single bit fields identified with a "1" bit, while single bit fields with a "0" bit are not monitored.

UE side behavior involves, based on the configuration sent in the MAC-CE command (e.g. MAC-CE command 700), the UE detecting and measuring reference signals that are on the indicated frequency layer and are associated with the indicated PCIs. For all the indicated frequency layers and corresponding indicated PCIs, the UE transmits a PUSCH towards the corresponding neighbor cell to notify the network of its reception of the MAC-CE command (e.g. MAC-CE command 700) for inter-cell mobility. Upon receiving the UL PUSCH transmission from the UE, the network knows that the UE has applied the content of the MAC-CE command (e.g. MAC-CE command 700) for inter-cell mobility that it received from the network via the source cell.

The UE may also acquire cell-specific information, e.g. initial BWP configuration, common CORESETs, common search space sets, etc., using PDSCH transmissions carrying MAC-CE commands.

The UE may also transmit a 1-bit field in the data block transmitted on the UL PUSCH to explicitly inform the neighbor cell that the UE has applied the MAC-CE command, which may include marking the completion of the inter-cell mobility management method. Other examples include sending N-bit fields in the data block on the UL PUSCH to inform the network via the neighbor cell about any pending data blocks that were supposed to be retransmitted by the source cell after receiving the PDSCH carrying the MAC-CE command. For each pending data block, this N-bit field, where N is a positive integer number, may include parameters such as, but not limited to a HARQ process index, the number of attempted transmissions for the pending data block, the missing redundancy versions of the data block, the size of the data block, and the MCS of the data block.

In a particular example demonstrating this embodiment, the UE is synchronized on frequency layer 1, in the cell using PCI=1. The UE is configured by the network to perform RRM measurements on frequency layer 1 (i.e. ssbFrequency 1 and subcarrierSpacing1) and frequency layer 2 (i.e. ssbFrequency 2 and subcarrierSpacing1). As in FIGS. 1B and 1C, the UE is on the edge of the serving cell with PCI=1 and in close proximity to Neighbor cell #1 with PCI=2 and Neighbor cell #2 with PCI=3 in frequency layer 1 (as shown in FIG. 1B) and Neighbor cell #0 with PCI=11, Neighbor cell #1 with PCI=12 and Neighbor cell #2 with PCI=13 in frequency layer 2 (as shown in FIG. 1C).

The network sends a MAC-CE command (e.g. MAC-CE command 700) to the UE in a PDSCH, the MAC-CE command (e.g. MAC-CE command 700) carrying (i.e. containing or including) an indication to synchronize on frequency layer 2 and to neighbor cells using PCIs 11, 12, 13, and 17. The UE sends an acknowledgement to the network of receipt of the PDSCH carrying the MAC-CE command (e.g. MAC-CE command 700) within a determined time, which is a processing time described above. After sending an acknowledgement to the network of receipt of the PDSCH carrying the MAC-CE command (e.g. MAC-CE command 700), the UE uses the configuration information contained in the MAC-CE command (e.g. MAC-CE command 700) to perform L1 measurements on reference signals (e.g. SS/PBCH blocks) associated to PCIs and the frequency layer indicated in the MAC-CE command.

The UE then acquires physical layer synchronization with the neighbor cells using the PCIs and the frequency layer indicated in the MAC-CE command (e.g. MAC-CE command 700) and acquires system information associated to the PCIs indicated in the MAC-CE command (e.g. MAC-CE command 700).

The UE then transmits a PUSCH to each neighbor cell whose PCI is indicated in the MAC-CE command (e.g. MAC-CE command 700) for inter-cell mobility. Parameters such as time/frequency resources, transmit power control, timing advance information may be contained or included in the MAC-CE command (e.g. MAC-CE command 700) or derived using tables or mathematical formulas.

Figure 7B:
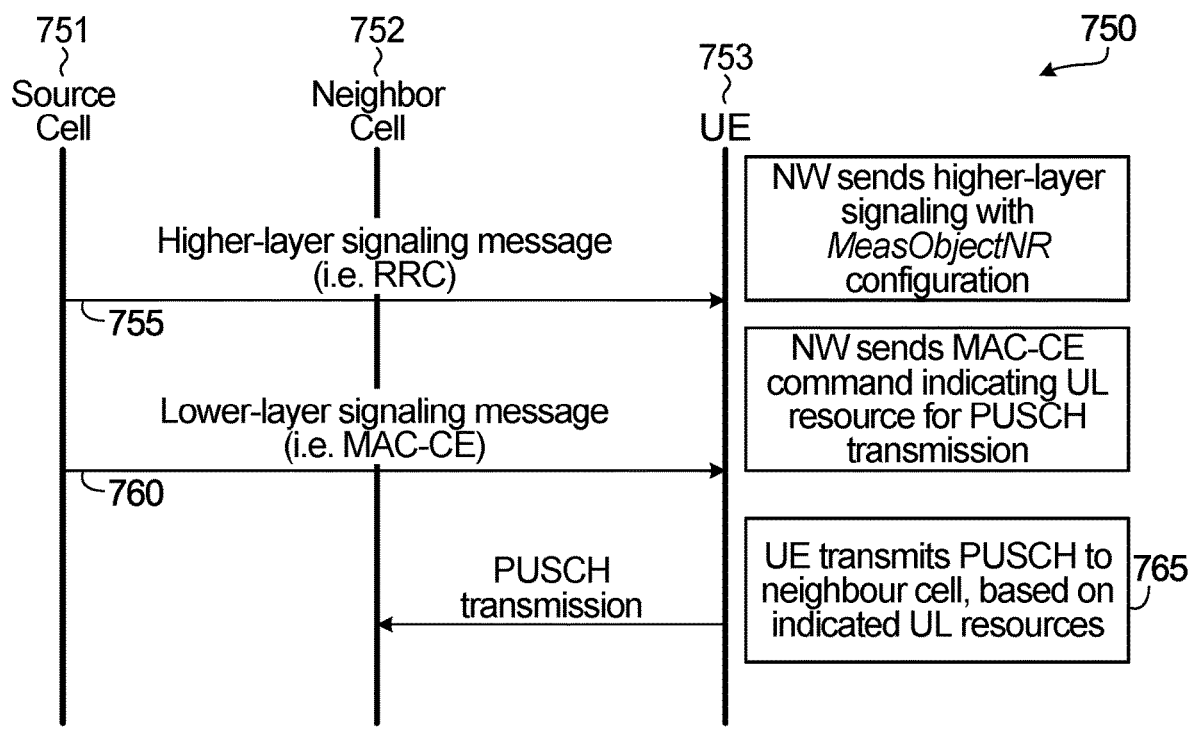
FIG. 7B is a flow diagram illustrating an example process of using L1/L2 signaling for enabling an uplink transmission mechanism acknowledging receipt of a handover message for inter-cell mobility according to an aspect of the present disclosure.

FIG. 7B is an example signaling diagram 750 of signaling (i.e. messages) being exchanged between the network (via a source cell 751 that is serving one or more UEs and a neighbor cell 752 of the source cell 751) and one UE 753 of the one or more UEs that is being served by the source cell 751, as well as behavior in response to having received messages from the network. The network (indicated by NW in FIG. 7B) via the source cell 751 sends 755 higher-layer signaling (i.e. a higher-layer message) to the UE 753, such as RRC signaling (i.e. a RRC message) with (i.e. containing or including) configuration information for the UE 753, which may include a MeasObjectNR configuration. The higher-layer signaling (i.e. the higher-layer message) may be Layer 3 signaling (i.e. a Layer 3 message). The network via the source cell 751 sends 760 a lower-layer signaling (i.e. a lower-layer message), in the form of an L1 signaling (i.e. L1 message) or L2 signaling (i.e. an L2 message), to the UE 753, such as a MAC-CE command (e.g. MAC-CE command 700). The MAC-CE command (e.g. MAC-CE command 700) may include UL resources for PUSCH transmission. The UE 753 sends (i.e. transmits) 765 PUSCH to the network via the neighbor cell 752 based on the UL resources in the MAC-CE command (e.g. the MAC-CE command 700).

Embodiments described above pertaining to using an uplink transmission mechanism for inter-cell mobility to acknowledge receipt of a handover message for inter-cell mobility may enable efficient inter-cell mobility management methods. In some embodiments, efficient inter-cell mobility management methods involve the UE acquiring physical layer synchronization and essential system information (e.g. MIB/SIB1) as part of RRM measurement, allowing the UE to experience smoother inter-cell mobility (i.e. handover) by simplifying the cell search process to just time and frequency synchronization.

Embodiments described above pertaining to using an uplink transmission mechanism for inter-cell mobility to acknowledge receipt of a handover message for inter-cell mobility may enable faster UE processing. In some embodiments, faster UE processing may enable L1-based UL synchronization. After the UE applies the MAC-CE command (e.g. MAC-CE command 700) for inter-cell mobility, and the UE transmits an UL PUSCH transmission towards each of the neighbor cells whose PCI is indicated in the MAC-CE command (e.g. MAC-CE command 700).

Embodiments described above pertaining to using an uplink transmission mechanism for inter-cell mobility to acknowledge receipt of a handover message for inter-cell mobility may simplify the mobility (i.e. handover) using fast UL timing adjustment in part by the network indicating an UL PUSCH field, indicating to the UE the UL resources to use to transmit the PUSCH, the Transmit Power to use, and the timing advance to use.

Embodiments described above pertaining to using an uplink transmission mechanism for inter-cell mobility to acknowledge receipt of a handover message for inter-cell mobility may constitute a simplified and fast uplink timing adjustment. The network indicates to the UE the UL PUSCH resources to use so that the UE can inform the neighbor cell of the reception of the MAC-CE command for inter-cell mobility. If the MAC-CE command (e.g. MAC-CE command 700) carries (i.e. contains or includes) cell-specific information such as common CORESETs, the neighbor cell can schedule UL transmissions by transmitting PDCCHs scheduling PUSCHs over the indicated common CORESETs.

Some embodiments are applicable to scenarios where the UE is switching between different frequency layers and performing targeted mobility, as well as to scenarios where the UE is switching between cells with different PCIs on the same frequency layer. The UE is notified which one or more neighbor cells the UE should be monitoring and sends an UL transmission to the indicated one or more neighbor cells using the indicated UL RA resources.

Network-side behavior involves the network sending a PDSCH transmission in lower-layer signaling (i.e. a lower-layer message), such as L1 signaling (i.e. L1 message) or L2 signaling (i.e. L2 message), to the UE. An example of such lower-layer signaling (i.e. lower-layer message) is a MAC-CE command. The MAC-CE command includes configuration information about the frequency layers, neighbor cell PCIs and RA preambles. Upon reception of an RA preamble included in a MAC-CE command for inter-cell mobility, the network via a neighbor cell sends a RA response in the form of a PDCCH transmission using the new UE identifier on the newly indicated CORESET and search space (SS).

Figure 8A:
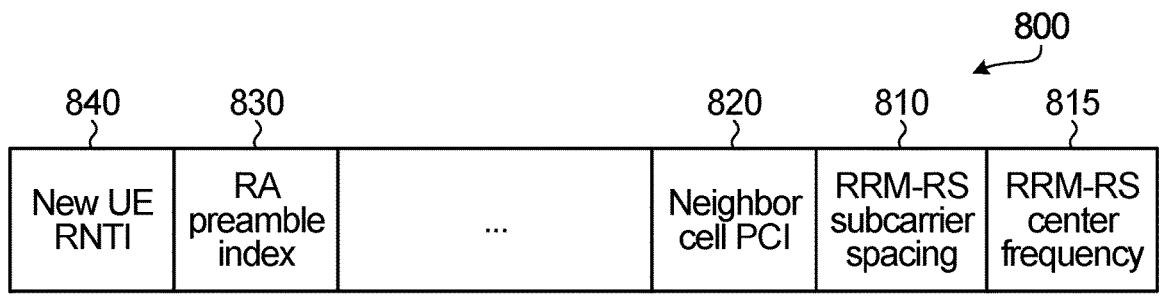
FIG. 8A is another example of a MAC-CE command for use in enabling an uplink transmission mechanism acknowledging receipt of a handover message for inter-cell mobility according to an aspect of the present disclosure.

An example of a MAC-CE command 800 is shown in FIG. 8A. The MAC-CE command 800 contains information about a frequency layer, physical cell identities, RA preamble indices and UE identifiers. The frequency layer is identified in the MAC-CE command 800 by RRM-RS center frequency field 815 and RRM-RS subcarrier spacing field 810. The PCIs are identified in the MAC-CE command 800 by Neighbor cell PCI field 820. The RA preamble index is identified in the MAC-CE command 800 by RA preamble index field 830. The UE identifier is identified in the MAC-CE command 800 by New UE RNTI 840. The blank section between Neighbor Cell PCI 820 and RA preamble index field 830 in FIG. 8A could be used for additional sets of Neighbor Cell PCI, RA preamble index and New UE RNTI for other Neighbor Cell PCIs. FIG. 8A is a particular example of a MAC-CE command 800, but other examples of a MAC-CE command may include other fields, fields of the MAC-CE command 800 arranged in different order, or multiple instances of the same field (e.g. per neighbor cell) of the MAC-CE command 800. For each neighbor cell whose PCI is indicated, the MAC-CE command (e.g. MAC-CE command 800) can carry (i.e. contain or include) UE identifiers and UL PUSCH fields associated with a given PCI.

UE behavior involves, based on the configuration information contained in the MAC-CE command (e.g. MAC-CE command 800), the UE detecting and measuring reference signals that are on the indicated frequency layer and are associated with the indicated PCIs. For all the indicated frequency layers and corresponding indicated PCIs, the UE transmits an RA preamble towards the corresponding neighbor cell to notify the neighbor cell of the UE's reception of the MAC-CE command (e.g. MAC-CE command 800) for inter-cell mobility.

The UE may also acquire cell-specific information, e.g. initial BWP configuration, common CORESETs, common search space sets, etc., using PDSCH transmissions carrying MAC-CE commands.

In a particular example demonstrating this embodiment, the UE is synchronized on frequency layer 1, in the cell using PCI=1. The UE is configured by the network to perform RRM measurements on frequency layer 1 (i.e. ssbFrequency 1 and subcarrierSpacing1) and frequency layer 2 (i.e. ssbFrequency 2 and subcarrierSpacing1). As in FIGS. 1B and 1C, the UE is on the edge of the serving cell with PCI=1 and in close proximity to Neighbor cell #1 with PCI=2 and Neighbor cell #2 with PCI=3 in frequency layer 1 (as shown in FIG. 1B) and Neighbor cell #0 with PCI=11, Neighbor cell #1 with PCI=12 and Neighbor cell #2 with PCI=13 in frequency layer 2 (as shown in FIG. 1C).

The network sends a MAC-CE command (e.g. MAC-CE command 800) to the UE in a PDSCH, the MAC-CE command (e.g. MAC-CE command 800) carrying an indication to synchronize on frequency layer 2 and to neighbor cells using PCIs 11, 12, 13, and 17. The UE sends an acknowledgement of receipt of the PDSCH carrying the MAC-CE command (e.g. MAC-CE command 800) to the network within a determined time, which is a processing time described above. After sending an acknowledgement of receipt of the MAC-CE command (e.g. MAC-CE command 800), the UE uses the configuration information contained in the MAC-CE command (e.g. MAC-CE command 800) to perform L1 measurements on reference signals (e.g. SS/PBCH blocks) associated with PCIs and the frequency layer indicated in the MAC-CE command.

The UE acquires physical layer synchronization with the neighbor cells using the PCIs and the frequency layer indicated in the MAC-CE command (e.g. MAC-CE command 800) and acquires system information associated to the PCIs indicated in the MAC-CE command.

The UE then transmits a RA preamble to the network via each neighbor cell whose PCI is indicated in the MAC-CE command (e.g. MAC-CE command 800) for inter-cell mobility. The RA preamble can be generated based on parameters such as the RA preamble index, transmit power control, timing advance value that are received in the MAC-CE command (e.g. MAC-CE command 800) or possibly derived using tables.

Figure 8B:
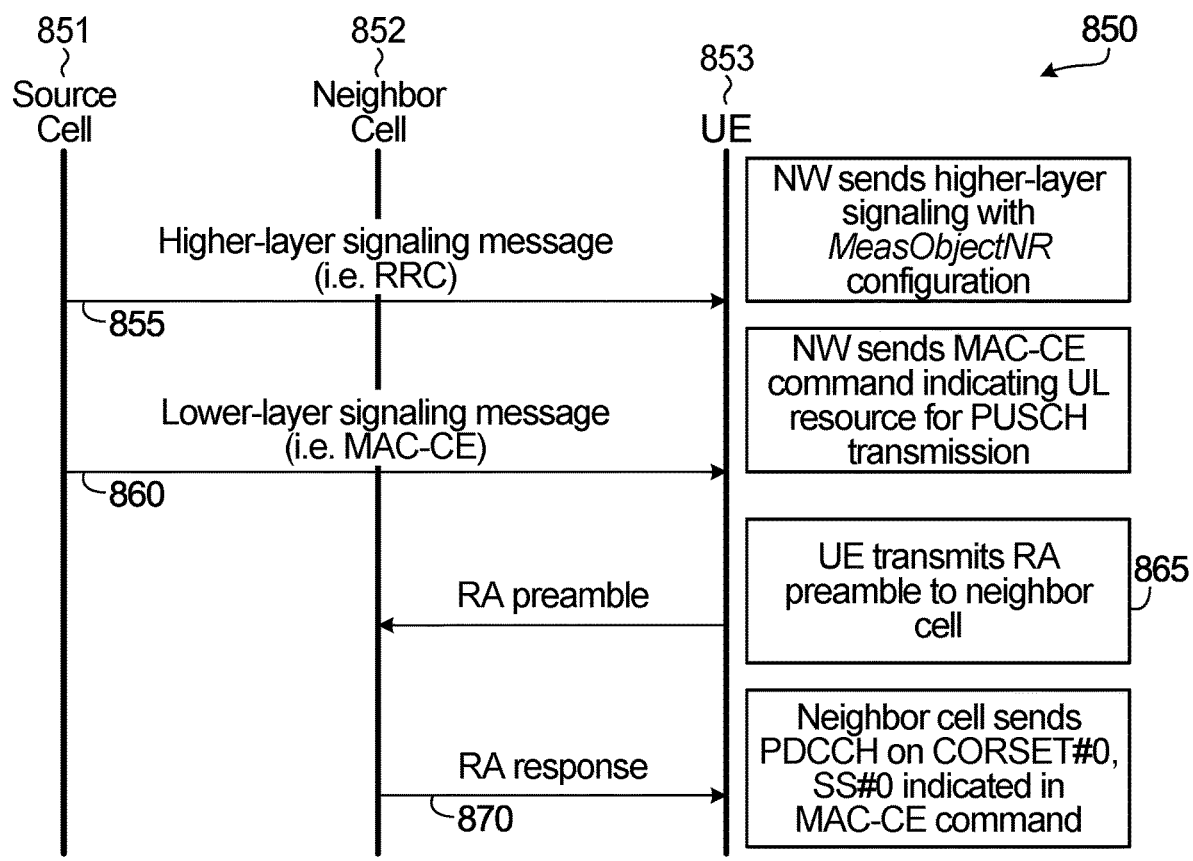
FIG. 8B is another flow diagram illustrating an example process of using L1/L2 signaling for enabling an uplink transmission mechanism acknowledging receipt of a handover message for inter-cell mobility according to an aspect of the present disclosure.

FIG. 8B is an example signaling diagram 850 of signaling (i.e. messages) being exchanged between the network (via a source cell 851 that is serving one or more UEs and a neighbor cell 852 of the source cell 851) and one UE 853 of the one or more UEs being served by the source cell 851, as well as behavior in response to having received signaling (i.e. messages) from the network. The network (indicated by NW in FIG. 8B) via the source cell 851 sends 855 higher-layer signaling (i.e. a higher-layer message) to the UE 853, such as RRC signaling (i.e. a RRC message) with (i.e. containing or including) configuration information for the UE, which may include a MeasObjectNR configuration. The higher-layer signaling (i.e. higher-layer message) may be a Layer 3 signaling (i.e. a Layer 3 message). The network via the source cell 851 sends 860 a lower-layer signaling (i.e. a lower-layer message), in the form of L1 signaling (i.e. a L1 message) or L2 signaling (i.e. a L2 message), to the UE 853. The lower-layer signaling (i.e. lower-layer message) may be a MAC-CE command such as a MAC-CE command 800 including UL resources for PUSCH transmission. The UE 853 sends 865 an RA preamble to the network via the neighbor cell 852 (e.g. a TRP corresponding to the neighbor cell). In response to the RA preamble from the UE 853, the network via the neighbor cell 852 sends 870 an RA response on PDCCH on the CORESET #0, SS #0 indicated in the MAC-CE command (e.g. MAC-CE command 800).

Embodiments described above pertaining to using an uplink transmission mechanism for inter-cell mobility to acknowledge receipt of a handover message for inter-cell mobility may including transmitting an acknowledgment of receipt of a handover message for inter-cell mobility. enable efficient inter-cell mobility management methods. In some embodiments, efficient inter-cell mobility management methods involve the UE acquiring physical layer synchronization and essential system information (e.g. MIB/SIB1) as part of RRM measurement, allowing the UE to experience smoother mobility (i.e. handover) by simplifying the cell search process to just acquiring time and frequency synchronization.

Embodiments described above pertaining to using an uplink transmission mechanism for inter-cell mobility to acknowledge receipt of a handover message for inter-cell mobility may enable faster UE processing for UL synchronization to the network via the neighbor cell. In some embodiments, faster UE processing may enable L1-based UL synchronization. After the UE applies the MAC-CE command (e.g. MAC-CE command 800) for inter-cell mobility, the UE transmits an UL RA transmission towards each of the neighbor cells whose PCI is indicated in the MAC-CE command (e.g. MAC-CE command 800).

Embodiments described above pertaining to using an uplink transmission mechanism for inter-cell mobility to acknowledge receipt of a handover message for inter-cell mobility may simplify inter-cell mobility (i.e. handover) using fast UL timing adjustment in part by the network indicating an UL RA field, indicating to the UE the UL resources to use to transmit the RA preamble, the Transmit Power to use, and the timing advance to use.

Embodiments described above pertaining an uplink transmission mechanism for inter-cell mobility to acknowledge receipt of a handover message for inter-cell mobility may constitute a simplified and fast uplink timing adjustment. The network indicates to the UE the UL RA preamble index to use so that the UE can inform the network via the neighbor cell (e.g. a TRP corresponding to the neighbor cell) of the reception of the MAC-CE command (e.g. MAC-CE command 800) for inter-cell mobility. Upon receiving the RA preamble from the UE, the network via the neighbor cell sends an RA response to the UE to finalize the RA process.

Steps in FIGS. 4B, 5B, 6B, 7B and 8B that are similarly described, for example the network, via the source cell, sending either RRC signaling or RRC messages (e.g. MAC-CE commands), may be a similar type of message that contains similar configuration information useful for the respective embodiments described. That is to say, if two or more of the described embodiments are used together, the respective steps of each process are not necessarily repeated multiple times or performed separately. A single MAC-CE command including all the relevant configuration information for the separate processes may be used. This will be shown more clearly in the following two examples where multiple embodiments are described as being implemented together.

Example 1

A first example of an inter-cell mobility management method that includes the processes of multiple of above embodiments will now be described. Referring again to the frequency layers shown in FIG. 1A and the physical source and neighbor cells represented in FIGS. 1B and 1C, a UE is synchronized on frequency layer 1, in the serving cell using PCI=1. The UE is configured by the network to perform RRM measurements on frequency layer 1 (i.e. ssbFrequency 1 and subcarrierSpacing1) and frequency layer 2 (i.e. ssbFrequency 2 and subcarrierSpacing1) using SS/PBCH blocks. The neighbor cells in frequency layer 1 are using PCIs={2; 3; 4; 5; 6; 7}, the neighbor cells in frequency layer 2 are using PCIs={11; 12; 13; 14; 15; 16; 17}.

The UE performs RRM measurements by detecting and measuring a RRM reference signal, for example in SS/PBCH blocks, on frequency layer 1 and frequency layer 2. As the UE moves and gets near the edge of the source cell (using PCI=1), the UE gets closer to neighbor cell #1 having PCI=2 and neighbor cell #2 having PCI=3.

Based on RRM measurement reports sent to the network by the UE, the network sends L2-based control signaling (i.e. an L2-based message) to the UE, instructing the UE to synchronize with and acquire system/cell-specific information for the neighbor cell on frequency layer 1 using PCI=2. The L2-based control signaling (L2-based message) also indicates an UL PUSCH resource field to the UE, so that the UE can send an acknowledgement to the network via the indicated neighbor cell of the reception of the L2-based control signaling (L2-based message) sent by the network from the serving cell.

In the particular example being described, the inter-cell mobility method (i.e. inter-cell mobility process) includes the UE performing steps including:

1) the UE applies the RRC signaling (i.e. RRC message) received from the network via the source cell, carrying higher-layer configuration information such as RRM measurement configuration and reporting;
2) the UE performs RRM measurements on reference signals on frequency layer 1 and frequency layer 2, wherein each frequency layer configures SS/PBCH block indexes to be used for RRM measurements;
3) the UE sends HARQ-ACK acknowledgement for the PDSCH carrying the MAC-CE command for inter-cell mobility;
4) the UE applies the MAC-CE command included in at least one of L1 control signaling (a L1 message) and L2 control signaling (an L2 message) and acquires physical layer synchronization with the neighbor cell using PCI=2 on the frequency layer indicated in the MAC-CE command. The UE applying the MAC-CE command may involve the UE copying the MAC-CE command the UE receives and stores the MAC-CE command in the memory (e.g. Flash, ROM, etc.) of the UE. The UE may start performing physical layer tasks, for instance mobility measurements, based on the content of the stored MAC-CE command;
5) the UE acquires system information (e.g. System Frame Number, SI-SchedulingInfo) and cell-specific information (e.g. CORESET #0, SS #0, Initial DL/UL BWP) associated with the indicated neighbor cell indicated in the MAC-CE command;
6) the UE transmits a PUSCH on the resources indicated in the MAC-CE command, to the network via the neighbor cell using PCI=2. This UL transmission (i.e. the transmission of the PUSCH) to the network via the neighbor cell is used to acknowledge the reception of the MAC-CE command from the network via the serving cell using PCI=1; and
7) the UE starts monitoring for PDCCH transmissions on the newly acquired cell-specific initial BWP, where PDCCH transmissions are carrying DCI formats scrambled with the UE RNTI indicated in the MAC-CE command.

While seven particular steps are described above, it is to be understood that not all of the above steps would necessarily be needed by a UE that is performing an inter-cell mobility management method (i.e. inter-cell mobility management process) according to aspects of the present disclosure. Furthermore, while particular PCI values, system parameters and cell-specific parameters are described in the steps above, these are only examples used for the purpose of describing the process and more generally the values would be implementation specific to the network involved.

Figure 9A:
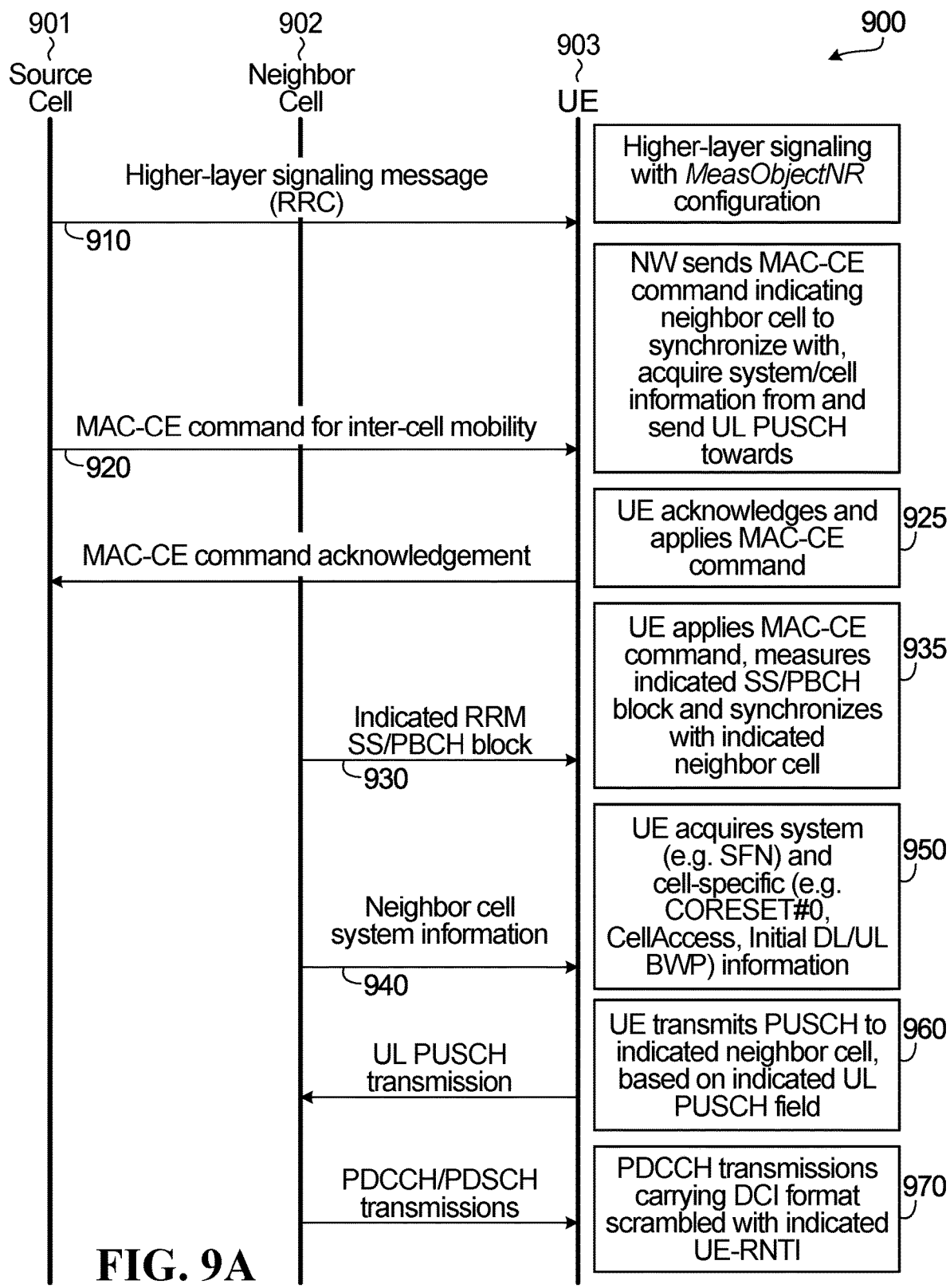
FIG. 9A is a flow diagram illustrating an example process of using L1/L2 signaling for enabling an uplink transmission mechanism for inter-cell mobility according to an aspect of the present disclosure.

FIG. 9A is an example signaling diagram 900 of signaling (i.e. messages) being exchanged between the network (via a source cell 901 that is serving one or more UEs and a neighbor cell 902 of the source cell 901) and one UE 903 of the one or more UEs being served by the source cell 901, as well as behavior in response to having received messages from the network. The network (indicated as NW in FIG. 9A) via the source cell 901 sends 910 to the UE 903 higher-layer signaling (i.e. a higher-layer message) for configuring the UE, such as RRC signaling (i.e. a RRC message), which may include a MeasObjectNR configuration. The network via the source cell 901 sends 920 to the UE 903 lower-layer signaling (i.e. a lower-layer message), in the form of L1 signaling (i.e. a L1 message) or L2 signaling (i.e. a L2 message), such as a MAC-CE command for inter-cell mobility. The MAC-CE command may include configuration information identifying frequency layer and neighbor cell to synchronize with, acquire system/cell information from and send UL PUSCH towards.

Figure 9B:
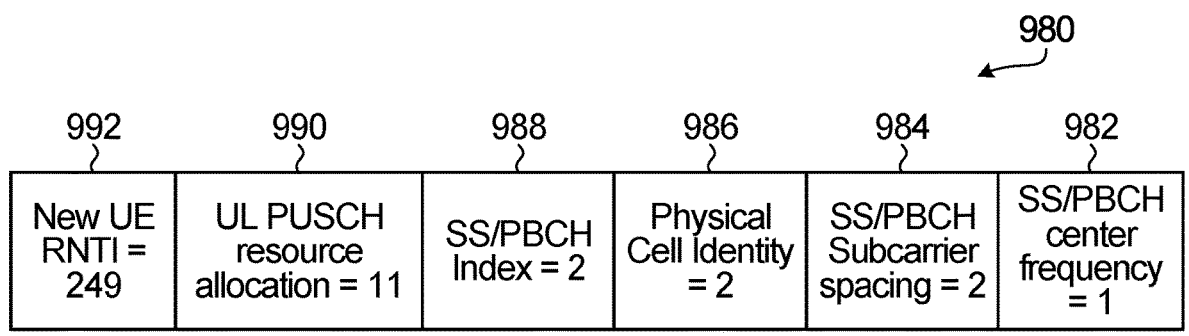
FIG. 9B is an example of a MAC-CE command for use in inter-cell mobility according to an aspect of the present disclosure.

FIG. 9B is an example of a MAC-CE command 980 combining various fields from embodiments described above. The frequency layer is identified in the MAC-CE command 980 by center frequency=1 982 and subcarrier spacing=2 984. The PCI is identified in the MAC-CE command 980 by PCI=2 986. The SS/PBCH Index is equal to 2 988. The UL PUSCH resource allocation is identified in the MAC-CE command 980 by UL PUSCH resource allocation=11 990. The UE identifier is identified in the MAC-CE command 980 by New UE RNTI=249 992.

FIG. 9B is a particular example of a MAC-CE command, but other examples of a MAC-CE command may include other fields, fields of the MAC-CE command 980 arranged in different order, or multiple instances of the same field (e.g. per neighbor cell) of the MAC-CE command 980. Furthermore, while particular values are used in the various fields of the example MAC-CE command 980, these are only examples used for the purpose of describing the process and more generally the values would be implementation specific to the network involved.

Referring again to FIG. 9A, the UE 903 sends 925 a MAC-CE acknowledgement (i.e. an acknowledgement) indicating that the UE 903 has successfully received the MAC-CE command (e.g. MAC-CE command 980). The network via the neighbor cell 902 sends 930 radio resource management SS/PBCH blocks. Based on the MAC-CE command, the UE 903 measures 935 the SS/PBCH blocks sent by the network via the neighbor cell 902. The network via the neighbor cell 902 broadcasts 940 system information. The UE receives 950 the neighbor cell system information (i.e. the system information broadcast by the neighbor cell 902) and cell specific information and stores the system information and the cell specific information in memory (e.g. memory 208). The system information may include, for example, SFN and the cell specific information may include, for example, CORESET #0, CellAccess information, and Initial DL/UP BWP information. The UE 903 sends (i.e. transmits) 960 UL PUSCH to the network via the neighbor cell 902 based on the UL resources identified in the MAC-CE command (e.g. MAC-CE command 980). The network via the neighbor cell 902 sends 970 PDCCH and PDSCH transmissions. The PDCCH transmission may for example carry DCI format scrambled with an indicated UE-RNTI.

After the UE 903 sends 960 the UL PUSCH transmission to the neighbor cell 902, the network via the neighbor cell 902 becomes the new serving cell and the UE 903 monitors for PDCCH transmissions from the network via the new serving cell. In the particular example described above using the MAC-CE command 980, the new UE RNTI is identified as 249. Example 2.

A second example of inter-cell mobility method using several of the above embodiments will now be described. Referring again to the frequency layers in FIG. 1A, and the physical source cell and neighboring cell in FIGS. 1B and 1C, the UE is synchronized on frequency layer 1, in the serving cell using PCI=1. The UE is configured by the network to perform RRM measurements on frequency layer 1 (in the form of csirsCenterFrequency 1 and subcarrierSpacing1) and frequency layer 2 (in the form of csirsCenterFrequency 2 and subcarrierSpacing1) using RRM CSI-RSs. CSI-RSs are used in this example as reference signals as opposed to SS/PBCH used in examples above. The neighbor cells in frequency layer 1 are using PCIs={2; 3; 4;

5; 6; 7}, the neighbor cells in frequency layer 2 are using PCIs={11; 12; 13; 14; 15; 16; 17}.

The UE performs RRM measurements by detecting and measuring e.g. CSI-RS blocks on frequency layer 1 and frequency layer 2. As the UE moves and gets near the edge of its serving cell (using PCI=1), the UE gets closer to the neighbor cells using PCI=2 and PCI=3 in frequency layer 1 and closer to the coverage area of neighbor cells using PCI=12 and PCI=13 in frequency layer 2.

Based on RRM measurement reports sent to the network by the UE, the network sends L2-based control signaling (i.e. an L2-based message), which may be a MAC-CE command, to the UE, indicating the UE to synchronize with and acquire system/cell-specific information from the network for the neighbor cell on frequency layer 2 using PCI=12. The L2-based control signaling (i.e. L2-based message) also indicates an UL RA preamble field and UL RA response window field to the UE. The UE transmits the RA preamble included in the RA preamble field of the L2-based control signaling (i.e. L2-based message) to the network via the indicated neighbor cell, which is an acknowledgement to the network via the indicated neighbor cell of the reception of the L2-based control signaling (L2-based message) from the network via the source cell, as well as a mechanism for the UE to get UL timing synchronization with the network via the neighbor cell.

In the particular example being described, the inter-cell mobility management method (i.e. inter-cell mobility management process)s includes the UE performing steps including:

1) the UE applies the RRC signaling (i.e. the RRC message) received from the network via the source cell, carrying higher-layer configuration information, such as RRM measurement configuration and reporting. The UE applying the RRC signaling may involve the UE copying the contents of the RRC signaling the UE receives and stores the contents of the RRC signaling in the memory (e.g. Flash, ROM, etc.) of the UE. The physical layer procedures the UE runs use the parameters that were provided in the RRC signaling;

2) the UE performs RRM measurements on frequency layer 1 and frequency layer 2, wherein each frequency layer configures CSI-RSs to be used for RRM measurements;

3) the UE sends HARQ-ACK acknowledgement for the PDSCH carrying the MAC-CE command for inter-cell mobility;

4) the UE applies the MAC-CE command received in at least one of L1 control signaling (L1 message) and L2 control signaling (i.e. L2 message) and acquires physical layer synchronization with the neighbor cell using PCI=12 on the frequency layer indicated in the MAC-CE command. The UE applying the MAC-CE command may involve the UE copying the MAC-CE command the UE receives and stores the MAC-CE command in the memory (e.g. Flash, ROM, etc.) of the UE. The UE may start performing physical layer tasks, for instance mobility measurements, based on the content of the stored MAC-CE command;

5) the UE updates system information parameters (e.g. System Frame Number, SI-SchedulingInfo) and cell-specific parameters (e.g. CORESET #0, SS #0, CellAccess, Initial DL/UL BWP) associated to the indicated CSI-RS of the neighbor cell indicated in the MAC-CE command;

6) the UE resets its RLM timer and flushes In-Sync/Out-of-Sync events from the higher layers, and uses the timer value and the counter value indicated in the MAC-CE command. RLM measurements are carried out on the RRM CSI-RS indicated in the MAC-CE command;

7) the UE transmits a RACH transmission to the network via the indicated neighbor cell using the RA preamble indicated in the MAC-CE command. This RACH transmission to the neighbor cell is used to acknowledge the reception of the MAC-CE command from the serving cell using PCI=1;

8) the UE monitors for the RA response (i.e. PDCCH transmission) on the newly acquired initial DL BWP for a DCI format scrambled with the UE RNTI indicated in the MAC-CE command, within the RA response window indicated in the MAC-CE command; and 9) the UE starts monitoring PDCCH transmissions on the newly acquired cell-specific initial BWP, where PDCCH transmissions are carrying DCI formats scrambled with the UE RNTI indicated in the MAC-CE command.

While nine particular steps are described above, it is to be understood that not all of the above steps would necessarily be needed by a UE that is performing an inter-cell mobility management method (i.e. inter-cell mobility management process) according to aspects of the present disclosure. Furthermore, while particular PCI values, system parameters and cell-specific parameters are described in the steps above, these are only examples used for the purpose of describing the process and more generally the values would be implementation specific to the network involved.

Figure 10A:
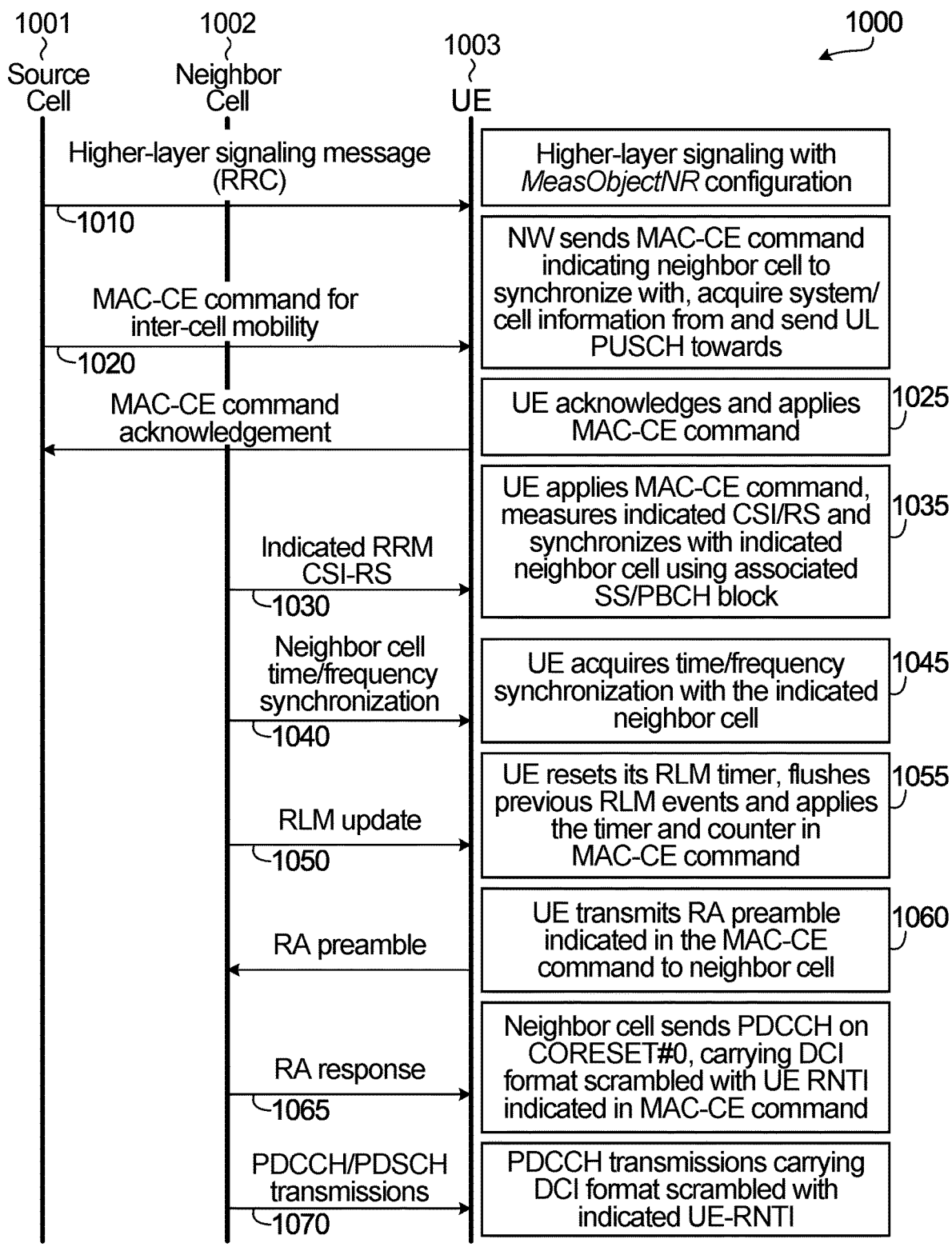
FIG. 10A is a flow diagram illustrating an example process of using L1/L2 signaling for enabling uplink transmission mechanism for inter-cell mobility according to an aspect of the present disclosure.

FIG. 10A is a signaling diagram 1000 of signaling (i.e. messages), including control signaling (i.e. control messages) being exchanged between the network (including a source cell 1001 that is serving one or more UEs and a neighbor cell 1002 of the source cell 1001) and one UE 1003 of the one or more UEs being served by the source cell 1001, as well as behavior in response to having received messages from the network. The network (indicated as NW in FIG. 10A) via the source cell 1001 sends 1010 a higher-layer signaling (i.e. higher-layer message) to the UE 1003, such as RRC signaling (i.e. a RRC message) including configuration information for the UE, which may include a MeasObjectNR configuration. The network via the source cell 1001 sends 1020 a lower-layer signaling (i.e. lower-layer message), in the form of an L1 control signaling (i.e. L1 message) or an L2 control signaling (i.e. L2 message), to the UE 1003, such as a MAC-CE command for inter-cell mobility. The MAC-CE command may include configuration information identifying a frequency layer and a neighbor cell to synchronize with, acquire system/cell information from and send UL PUSCH towards.

FIG. 10B is an example of a MAC-CE command 1080 combining various fields from embodiments described above. The RRM RS is identified in the MAC-CE command 1080 by a RRM channel state information reference signal (CSI-RS) absolute radio-frequency channel number (ARFCN)=49 1081 and RRM CSI-RS subcarrier spacing (SCS)=1 1082. The PCI is identified in the MAC-CE command 1080 by PCI=12 1083. The RRM CSI-RS index field is identified in the MAC-CE command 1080 by RRM CSI-RS index=2 1084. The SFN is identified in the MAC-CE command 1080 by System Frame Number=3 1085. The CORESET #0 is identified in the MAC-CE command 1080 by Control Resource Set Zero=11 1086. The SearchSpaceSet #0 is identified in the MAC-CE command 1080 by Search Space Set Zero=4 1091. The RA preamble index field is identified in the MAC-CE command 1080 by UL RA preamble index=5 1092. A UL RA response window field is identified in the MAC-CE command 1080 by UL RA response window=8 1093. The UE identifier is identified in the MAC-CE command 1080 by New UE RNTI=249 1094. The timer value is identified in the MAC-CE command by T310 time value=100 1095. The counter value is identified in the MAC-CE command by N311 counter=6 1096.

FIG. 10B is a particular example of a MAC-CE command 1080, but other examples of a MAC-CE command may include other fields, fields of the MAC-CE command 1080 arranged in different order, or multiple instances of the same field (e.g. per neighbor cell) MAC-CE command 1080. Furthermore, while particular values are used in the various fields of the example MAC-CE command (e.g. MAC-CE command 1080), these are only examples used for the purpose of describing the inter-cell mobility management method (i.e. inter-cell mobility management process) and more generally the values would be implementation specific to the network involved.

Referring again to FIG. 10A, the UE 1003 sends 1025 a MAC-CE acknowledgement to the source cell 1001 indicating that the UE 1003 has successfully received the MAC-CE command. The network via the neighbor cell 1002 transmits 1030 RRM CSI-RS. Based on the MAC-CE command (e.g. MAC-CE command 1080), the UE 1003 measures 1035 the CSI-RS transmitted by the network via the neighbor cell 1002 and synchronizes with the neighbor cell 1002 using an associated SS/PBCH block. The network via the neighbor cell 1002 broadcasts 1040 time/frequency synchronization information. The UE 1003 acquires 1045 the time/frequency synchronization information for the neighbor cell 1002 (i.e. the time time/frequency synchronization information broadcast by the neighbor cell 1002). The network via the neighbor cell 1002 sends 1050 a RLM update command. In response to the RLM update command, the UE 1003 performs tasks 1055, the tasks 1055 including one or more of resetting the RLM timer, flushing previous RLM events and applying the timer and counter configuration provided in the MAC-CE command (e.g. MAC-CE command 1080). The UE 1003 sends 1060 a RA preamble to the network for the neighbor cell 1002. In response to receipt of the RA preamble from the UE 1003, the network via the neighbor cell 1002 sends 1065 an RA response PDCCH on the CORESET #0, SS #0 indicated in the MAC-CE command (e.g. MAC-CE command 1080). The network via the neighbor cell 1002 sends 1070 PDCCH and PDSCH transmissions. The PDCCH transmission may for example carry DCI format information scrambled with an indicated UE-RNTI.

After receiving the RA response from the network for the neighbor cell, the neighbor cell 1002 becomes the new serving cell and the UE monitors for PDCCH transmissions from the network for the new serving cell using UE-RNTI=249.

Examples 1 and 2 are particular examples of how embodiments of inter-cell mobility management described above could be combined. As can be seen, various fields can be combined to form an appropriate MAC-CE command depending on steps performed by the network for the source cells, neighbor cells and performed by the UE. It is to be understood that these two examples are only two non-limiting ways that the various embodiments could be combined for inter-cell mobility processes.

In some embodiments, upon applying a MAC-CE command for inter-cell mobility received from network for a source cell, the UE starts an inter-cell mobility timer. While the inter-cell mobility timer is running at the UE, the UE attempts to detect and measure the indicated RRM-RS from the network via the indicated neighbor cell and attempting to acquire basic system information (e.g. MIB) from the network for the indicated neighbor cell. If the UE successfully acquires system information from the network for the indicated neighbor cell before the inter-cell mobility timer expires, then the UE continues to monitor transmissions (such as PDCCH transmissions) from the network for the indicated neighbor cell. If the UE fails to successfully acquire system information from the network for the indicated neighbor cell before the inter-cell mobility timer expires, then the UE stops monitoring transmissions from the network for the indicated neighbor cell and the UE initiates a random access procedure (i.e. a random access process) by transmitting a random access preamble to the network via the source cell. The initiation of such a random access procedure (i.e. a random access process) is a way for the UE to indicate that the inter-cell mobility management methods has failed. The inter-cell mobility timer value may be configured by higher-layer signaling (i.e. higher-layer messages) and is triggered upon reception of a MAC-CE command for inter-cell mobility.

In some embodiments, upon applying a MAC-CE command for inter-cell mobility received from a network for a source cell, the UE starts an inter-cell mobility timer. While the inter-cell mobility timer is running at the UE, the UE attempts to detect and measure the indicated RRM-RS sent by the network for the indicated neighbor cell and attempts to acquire basic system information (e.g. MIB) from the indicated neighbor cell. If the UE successfully detects the indicated RRM-RS sent by the network for the indicated neighbor cell before the inter-cell mobility timer expires, then the UE continues to monitor transmissions (such as PDCCH transmissions) from the network for the indicated neighbor cell. If the UE fails to successfully detect the indicated RRM-RS from the network for the indicated neighbor cell before the inter-cell mobility timer expires, then the UE stops monitoring transmissions from the network for the indicated neighbor cell and initiates a random access procedure (i.e. a random access process) by transmitting a random access preamble to the network via the source cell. The initiation of such a random access procedure (i.e. a random access process) is a mechanism for the UE to indicate that the inter-cell mobility management methods has failed. The inter-cell mobility timer value may be configured by higher-layer signaling (i.e. higher-layer messages) and is triggered upon reception of a MAC-CE command for inter-cell mobility.

In some embodiments, upon applying a MAC-CE command for inter-cell mobility received from the network for a source cell, the UE starts a measurement window for inter-cell mobility. While the inter-cell mobility timer is running at the UE, the UE attempts to detect and measure the indicated RRM-RS from the network for the indicated neighbor cell. If the RRM-RS reference signal received power (RSRP) is above a certain threshold for every measurement instance in the measurement window, then the UE continues to monitor transmissions (such as PDCCH transmissions) from the network for the indicated neighbor cell. If the RRM-RS RSRP falls below a certain threshold for one or more measurement instances in the measurement window, then the UE stops monitoring transmissions from the indicated neighbor cell and initiates a random access procedure (i.e. a random access process) by transmitting a random access preamble to the network via the source cell. The initiation of such a random access procedure (i.e. a random access process) is a mechanism for the UE to indicate that the inter-cell mobility management method has failed. The measurement window may be configured by higher-layer signaling (i.e. higher-layer messages) using a duration and a periodicity e.g. in OFDM symbols, groups of OFDM symbols, mini-slots, slots, groups of slots.

In some other embodiments, the UE applies the content of a MAC-CE command for inter-cell mobility management received from a TRP corresponding to a source cell after having detected and measured a first instance of RRM-RS received from a TRP corresponding to an indicated neighbor cell transmitted by the TRP corresponding to the neighbor cell, after the UE received the MAC-CE command for inter-cell mobility from network via the source cell. If the RSRP of the RRM-RS is above a certain threshold, then the UE applies the content of the MAC-CE command for inter-cell mobility received from the source cell and considers that the TRP corresponding to the indicated neighbor cell is a suitable TRP to receive transmissions from. If the RSRP of the RRM-RS is below a certain threshold, then the UE does not apply the content of the MAC-CE command for inter-cell mobility received from the emitting source cell and initiates a random access procedure (i.e. a random access process) by transmitting a random access preamble to the network via the source cell. The initiation of such a random access procedure (i.e. a random access process) is a mechanism for the UE to indicate that the inter-cell mobility management method has failed.

In some other embodiments, the UE does not expect to receive a MAC-CE command for inter-cell mobility within a certain gap of another MAC-CE command for inter-cell mobility. The gap can be given in number of OFDM symbols, groups of OFDM symbols, mini-slots, slots, groups of slots. If a UE receives a MAC-CE command for inter-cell mobility within a certain gap of another MAC-CE command for inter-cell mobility, then the UE discards the latest received MAC-CE command for inter-cell mobility. If a UE receives a MAC-CE command for inter-cell mobility outside of a certain gap of another MAC-CE command for inter-cell mobility, then the UE processes the received MAC-CE command for inter-cell mobility as per the embodiments described in this application.

In some other embodiments, the UE transmits an UL PUSCH to the network via the neighbor cell indicated in the MAC-CE command for inter-cell mobility after having acquired basic system information (e.g. MIB) from the network for the indicated neighbor cell. This allows the UE to acknowledge to the network via the neighbor cell the reception of the MAC-CE command for inter-cell mobility from the network for the source cell as well as the fact that the UE has acquired basic system information from the network for the neighbor cell.

In some other embodiments, the UE signals the maximum number of neighbor cells that can be indicated in a MAC-CE command for inter-cell mobility as part of its UE capability report to the network, to indicate to the network its ability to support inter-cell mobility as described in other embodiments of this application. The UE does not expect to receive from the network a MAC-CE command for inter-cell mobility indicating more neighbor cells than the maximum number of neighbor cells that the UE indicated in its capability report.

In some other embodiments, the UE signals the maximum number of RRM-RSs that can be indicated in a MAC-CE command for inter-cell mobility as part of the UE capability report to the network, to indicate to the network the UE's ability to support inter-cell mobility as described in other embodiments of this application. The UE does not expect to receive from the network a MAC-CE command for inter-cell mobility indicating more RRM-RSs transmitted by TRPs corresponding to one or more neighbor cells than the maximum number of RRM-RSs that the UE indicated in its capability report.

In some other embodiments, the UE signals the maximum number of UE RNTIs that can be indicated in a MAC-CE command for inter-cell mobility as part of the UE capability report to the network, to indicate to the network the UE's ability to support inter-cell mobility as described in other embodiments of this application. The UE does not expect to receive from the network a MAC-CE command for inter-cell mobility indicating more UE RNTIs than the maximum number of UE RNTIs that the UE indicated in its capability report.

In some other embodiments, the UE signals the maximum number of frequency layers that can be indicated in a MAC-CE command for inter-cell mobility as part of the UE capability report to the network, to indicate to the network the UE's ability to support inter-cell mobility as described in other embodiments of this application. The UE does not expect to receive from the network a MAC-CE command for inter-cell mobility indicating more frequency layers than the maximum number of frequency layers that the UE indicated in its capability report.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for performing inter-cell mobility management comprising:
   receiving, by a user equipment (UE) from a network via a source cell, a higher-layer signaling comprising configuration information for measuring radio resource management reference signals (RRM-RSs) from the network via neighbor cells;
   receiving, by the UE from the network via the source cell, at least one of a Layer 1 (L1) or a Layer 2 (L2) signaling including additional configuration information;

receiving, by the UE, the RRM-RS from the network via the identified neighbor cell;

measuring, by the UE, the received RRM-RS based on the additional configuration information after the UE synchronizes with the network via the identified neighbor cell based on the received RRM-RS; and acquiring, by the UE, system information from the network via the identified neighbor cell, wherein the additional configuration information enables the UE to perform radio link monitoring (RLM) for the identified neighbor cell for inter-cell mobility and the method comprises:

subsequent to the acquiring system information from the network via the identified neighbor cell, resetting, by the UE, a RLM timer and one or more counters based on the additional information; and measuring, by the UE, the received RRM-RS received from the network via the identified neighbor cell for RLM based on the additional configuration information.

2. A method for performing inter-cell mobility management comprising:

receiving, by a user equipment (UE) from a network via a source cell, a higher-layer signaling comprising configuration information for measuring radio resource management reference signals (RRM-RSs) from the network via neighbor cells;

receiving, by the UE from the network via the source cell, at least one of a Layer 1 (L1) or a Layer 2 (L2) signaling including additional configuration information;

receiving, by the UE, a RRM-RS from the network via the identified neighbor cell;

measuring, by the UE, the received RRM-RS based on the additional configuration information included in the received at least one of the L1 or the L2 signaling after the UE synchronizes with the network via the identified neighbor cell based on the received RRM-RS;

updating the UE based on system information included in the additional configuration information included in the received at least one of the L1 or L2 signaling; and transmitting, by the UE to the network via the identified neighbor cell, an acknowledgement of receipt by the UE of the system information for the identified neighbor cell.

3. The method of claim 2, wherein the additional configuration information further enables the UE to transmit an uplink transmission to the network via the identified neighbor cell for inter-cell mobility to acknowledge receipt of a handover message for inter-cell mobility and the method comprises:

transmitting, by the UE to the network via the identified neighbor cell, on a physical uplink shared channel (PUSCH) identified in the additional configuration information included in the received at least one of the L1 or the L2 signaling.

4. The method of claim 2, wherein the additional configuration information further enables the UE to transmit an acknowledgement to the network via the identified neighbor cell for inter-cell mobility to acknowledge receipt of a handover message for inter-cell mobility and the method comprises:

transmitting, by the UE, to the network via the identified neighbor cell, a random access (RA) preamble included in additional content information in the received at least one of the L1 or the L2 signaling; and receiving, by the UE from the network via the identified neighbor cell, an RA response to the RA preamble.

5. The method of claim 1, wherein the additional configuration information further enables the UE to transmit an uplink transmission to the network via the identified neighbor cell for inter-cell mobility to acknowledge receipt of a handover message for inter-cell mobility and the method comprises:

transmitting, by the UE to the network via the identified neighbor cell, on a physical uplink shared channel (PUSCH) identified in the additional configuration information included in the received at least one of the L1 or the L2 signaling.

6. The method of claim 1, wherein the additional configuration information further enables the UE to transmit an acknowledgement to the network via the identified neighbor cell for inter-cell mobility to acknowledge receipt of a handover message for inter-cell mobility and the method comprises:

transmitting, by the UE, to the network via the identified neighbor cell, a random access (RA) preamble included in additional content information in the received at least one of the L1 or the L2 signaling; and receiving, by the UE from the network via the identified neighbor cell, an RA response to the RA preamble.

7. The method of claim 1, wherein the at least one of the L1 or the L2 signaling comprises a media access control-control element (MAC-CE) command.

8. The method of claim 7, wherein the MAC-CE command comprises fields for one or more of:

frequency layer information comprising a center frequency for the RRM-RS or absolute radio frequency channel number (ARFCN) and subcarrier spacing;

physical cell identifier (PCI);

an index value of the RRM-RS;

Control Resource Set #0 resource location information;

Search Space Set #0 resource location information;

physical uplink shared channel (PUSCH) resource allocation;

radio link monitoring timer information;

radio link monitoring counter information;

UE radio network temporary identifier (RNTI); and

Random Access (RA) preamble index value.

9. The method of claim 7, wherein the MAC-CE command is received on a physical downlink shared channel (PDSCH).

10. A device comprising:

at least one processor coupled with one or more computer-readable media storing instructions which, when executed by the processor, cause the device to:

receive from a network via a source cell, a higher-layer signaling comprising configuration information for measuring radio resource management reference signals (RRM-RSs) from the network via neighbor cells;

receive from the network via the source cell, at least one of a Layer 1 (L1) or a Layer 2 (L2) signaling including additional configuration information, wherein the instructions, when executed by the processor, further cause the device to:

receive a RRM-RS from the network via the identified neighbor cell;

measure the received RRM-RS based on the additional configuration information included in the received at least one of the L1 or the L2 signaling after the device synchronizes with the network via the identified neighbor cell based on the received RRM-RS;

update the device based on system information included in the additional configuration information included in the received at least one of the L1 or L2 signaling; and transmit to the network via the identified neighbor cell, an acknowledgement of receipt by the device of the system information for the identified neighbor cell.

11. The device of claim 10, wherein the instructions, when executed by the processor, further cause the device to, when the additional configuration information enables the device to transmit an uplink transmission to the network via the identified neighbor cell for inter-cell mobility, on a physical uplink shared channel (PUSCH) identified in the additional configuration information included in the received at least one of the L1 or the L2 signaling.

12. The device of claim 10, wherein the instructions, when executed by the processor, further cause the device to, when the additional configuration information further enables the device to transmit an acknowledgment to the network via the identified neighbor cell for inter-cell mobility to acknowledge receipt of a handover message for inter-cell mobility, transmit to the network via the identified neighbor cell, a random access (RA) preamble included in additional content information in the received at least one of the L1 or the L2 signaling, and receive from the network via the identified neighbor cell, an RA response to the RA preamble.

13. A device comprising:
at least one processor coupled with one or more computer-readable media storing instructions which, when executed by the processor, cause the device to:
receive from a network via a source cell, a higher-layer signaling comprising configuration information for measuring radio resource management reference signals (RRM-RSs) from the network via neighbor cells;
receive from the network via the source cell, at least one of a Layer 1 (L1) or a Layer 2 (L2) signaling including additional configuration information;
wherein the instructions, when executed by the processor, further cause the device to,
receive the RRM-RS from the network via the identified neighbor cell;
measure the received RRM-RS based on the additional configuration information included in the received at least one of the L1 or the L2 signaling after the UE synchronizes with the network via the identified neighbor cell based on the received RRM-RS; and
acquire system information from the network via the identified neighbor cell,
wherein the additional configuration information enables the UE to perform radio link monitoring (RLM) for the identified neighbor cell for inter-cell mobility and wherein the instructions, when executed by the processor, further cause the device to:
subsequent to the UE acquiring system information from the network via the identified neighbor cell, reset a RLM timer and one or more counters based on the additional information included in the received at least one of the L1 or the L2 signaling;
receive a RRM-RS from the network via identified neighbor cell; and
measure the received RRM-RS received from the network via the identified neighbor cell for RLM based on the additional configuration information included in the received at least one of L1 or L2 signaling.

14. The device of claim 13, wherein the instructions, when executed by the processor, further cause the device to, when the additional configuration information further enables the device to transmit an acknowledgment to the network via the identified neighbor cell for inter-cell mobility to acknowledge receipt of a handover message for inter-cell mobility, transmit to the network via the identified neighbor cell, a random access (RA) preamble included in additional content information in the received at least one of the L1 or the L2 signaling, and receive from the network via the identified neighbor cell, an RA response to the RA preamble.

15. The device of claim 13, wherein the at least one of the L1 or the L2 signaling transmitted by the device comprises a media access control-control element (MAC-CE) command.

16. The device of claim 15, wherein the MAC-CE command comprises fields for one or more of:
frequency layer information comprising a center frequency of the RRM-RS or absolute radio frequency channel number (ARFCN) and subcarrier spacing;
physical cell identifier (PCI);
an index value of the RRM-RS;
Control Resource Set #0 information;
Search Space Set #0 information;
physical uplink shared channel (PUSCH) resource allocation;
radio link monitoring timer information;
radio link monitoring counter information;
UE radio network temporary identifier (RNTI); and
Random Access (RA) preamble index value.

17. The device of claim 15, wherein the MAC-CE command is transmitted on a physical downlink shared channel (PDSCH).

18. The method of claim 2, wherein the at least one of the L1 or the L2 message comprises a media access control-control element (MAC-CE) command.

19. The method of claim 18, wherein the MAC-CE command comprises fields for one or more of:
frequency layer information comprising a center frequency of the RRM RS or absolute radio frequency channel number (ARFCN) and subcarrier spacing;
physical cell identifier (PCI);
an index value of the RRM-RS;
Control Resource Set #0 information;
Search Space Set #0 information;
physical uplink shared channel (PUSCH) resource allocation;
radio link monitoring timer information;
radio link monitoring counter information;
UE radio network temporary identifier (RNTI); and
Random Access (RA) preamble index value.

20. The method of claim 18, wherein the MAC-CE command is transmitted on a physical downlink shared channel (PDSCH).

21. The device of claim 10, wherein the at least one of the L1 or the L2 message comprises a media access control-control element (MAC-CE) command.

22. The device of claim 21, wherein the MAC-CE command comprises fields for one or more of:
frequency layer information comprising a center frequency of the RRM RS or absolute radio frequency channel number (ARFCN) and subcarrier spacing;
physical cell identifier (PCI);
an index value of the RRM-RS;
Control Resource Set #0 information;
Search Space Set #0 information;
physical uplink shared channel (PUSCH) resource allocation;

radio link monitoring timer information;
radio link monitoring counter information;
UE radio network temporary identifier (RNTI); and
Random Access (RA) preamble index value.

23. The device of claim 21, wherein the MAC-CE command is transmitted on a physical downlink shared channel (PDSCH).

24. The device of claim 13, wherein the instructions, when executed by the processor, further cause the device to, when the additional configuration information enables the device to transmit an uplink transmission to the network via the identified neighbor cell for inter-cell mobility, on a physical uplink shared channel (PUSCH) identified in the additional configuration information included in the received at least one of the L1 or the L2 signaling.

* * * * *